US012742876B2

(12) United States Patent
Barras et al.

(10) Patent No.: US 12,742,876 B2
(45) Date of Patent: Sep. 22, 2026

(54) METHOD FOR TRANSCEIVING A MESSAGE FOR UWB DISTANCE MEASUREMENT, METHOD AND SYSTEM FOR DISTANCE MEASUREMENT AND TRANSCEIVER FOR UWB DISTANCE MEASUREMENT

(71) Applicant: INFINEON TECHNOLOGIES SWITZERLAND AG, Zurich (CH)

(72) Inventors: David Barras, Sierre (CH); Boris Danev, Thalwil (CH)

(73) Assignee: Infineon Technologies Switzerland AG, Zürich (CH)

( * ) Notice: Subject to any disclaimer, the term of this patent is extended or adjusted under 35 U.S.C. 154(b) by 221 days.

(21) Appl. No.: 18/564,248

(22) PCT Filed: May 18, 2022

(86) PCT No.: PCT/EP2022/063417
§ 371 (c)(1),
(2) Date: Nov. 27, 2023

(87) PCT Pub. No.: WO2022/248302
PCT Pub. Date: Dec. 1, 2022

(65) Prior Publication Data

US 2024/0241246 A1 Jul. 18, 2024

(30) Foreign Application Priority Data

May 28, 2021 (EP) .................................... 21176595
Jan. 21, 2022 (EP) .................................... 22152697

(51) Int. Cl.
*G01S 13/76* (2006.01)

(52) U.S. Cl.
CPC .................................. *G01S 13/765* (2013.01)

(58) Field of Classification Search
CPC .. H04B 1/7163; H04B 1/7183; H04B 1/7176; H04B 1/69; H04B 1/7073; G01S 13/765
See application file for complete search history.

(56) References Cited

U.S. PATENT DOCUMENTS

2011/0076945 A1 3/2011 Chang et al.
2018/0254910 A1 9/2018 Dutz et al.
2019/0195982 A1 6/2019 El Assaad
2020/0014526 A1 1/2020 Hammerschmidt et al.
2020/0198580 A1* 6/2020 Saleh ..................... B60R 25/24
2021/0063550 A1* 3/2021 Ramakrishnan ...... H03M 1/126
(Continued)

FOREIGN PATENT DOCUMENTS

WO 2021089195 A1 5/2021

*Primary Examiner* — William Kelleher
*Assistant Examiner* — Juliana Cross
(74) *Attorney, Agent, or Firm* — Elmore Patent Law Group, P.C.; Joseph C. Zucchero; Carolyn S. Elmore

(57) ABSTRACT

Method for transceiving a message (M) for UWB distance measurement: transceiving a first information portion (A) via a narrowband channel; transceiving after the first information portion a second information portion (B) via a UWB channel, wherein the second information portion (B) comprises a distance pulse sequence being a pulse sequence to be used for distance measurement; wherein the first information portion (A) and the second information portion (B) are transceived in a common message frame.

18 Claims, 5 Drawing Sheets

(56) References Cited

U.S. PATENT DOCUMENTS

2021/0258795 A1* 8/2021 Schober ................ H04W 12/63
2022/0141076 A1* 5/2022 Hammerschmidt .. H04L 5/0098
375/262

* cited by examiner

TX
MI
$A_{NB}$, $B1_{UWB1}$
MII
$A_{NB}$, $B2_{UWB2}$
MIII
$A_{NB}$, $B3_{UWB3}$
RX

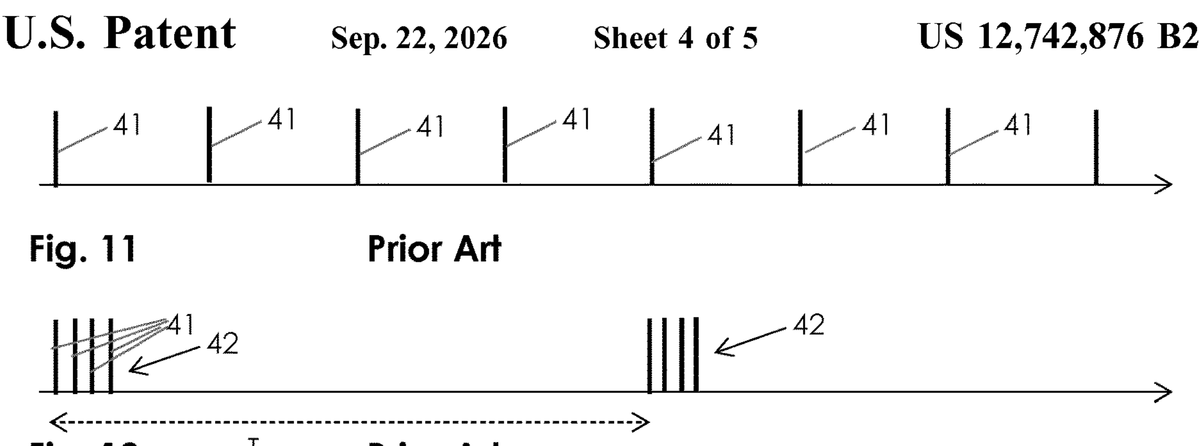
Fig. 11 Prior Art
Fig. 12 Prior Art
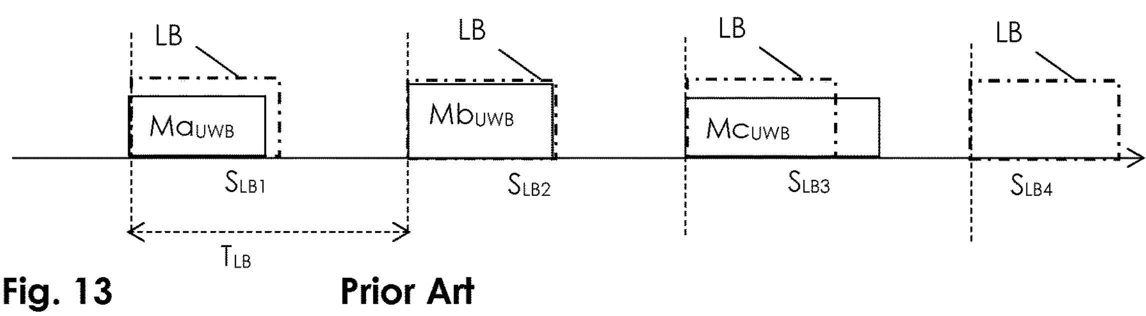
Fig. 13 Prior Art
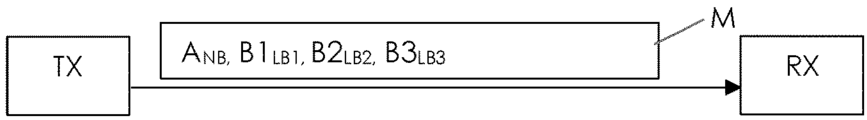
Fig. 14
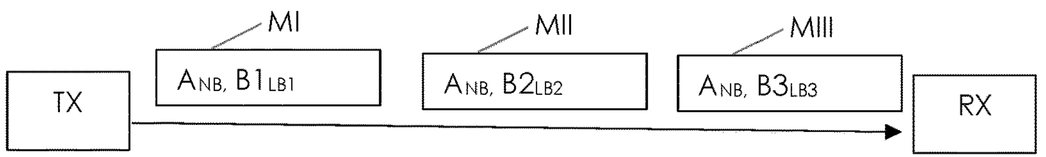
Fig. 15
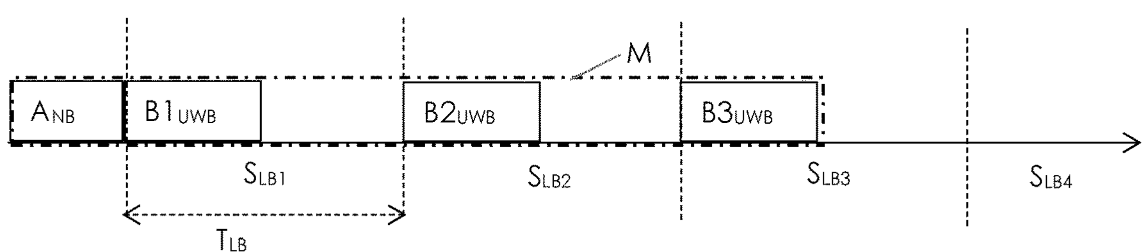
Fig. 16

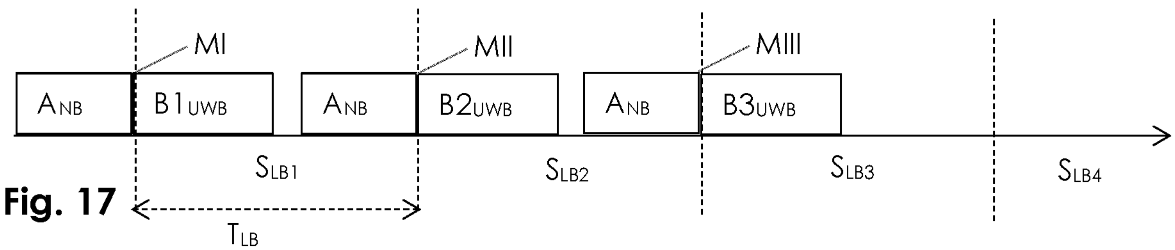
Fig. 17
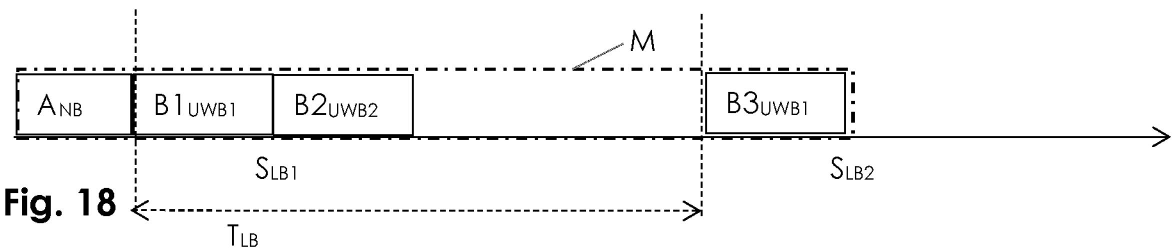
Fig. 18
| | B1 | B2 | B3 | B4 |
|---|---|---|---|---|
| 1 | N | N | N | N |
| 2 | N1 | N2 | N3 | N4 |
| 3 | N | N | N | SEC |
| 4 | N, SEC1 | N, SEC2 | N, SEC3 | N, SEC4 |
Fig. 19
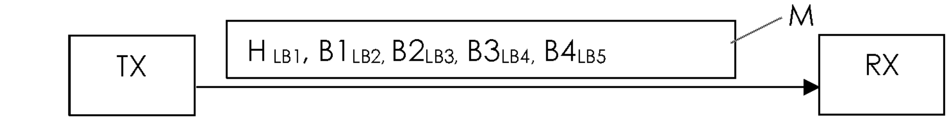
Fig. 20
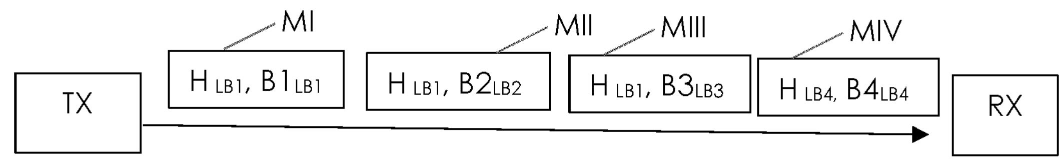
Fig. 21

METHOD FOR TRANSCEIVING A MESSAGE FOR UWB DISTANCE MEASUREMENT, METHOD AND SYSTEM FOR DISTANCE MEASUREMENT AND TRANSCEIVER FOR UWB DISTANCE MEASUREMENT

TECHNICAL FIELD

The present invention relates to the field of ultrawideband (UWB) distance measurement, in particular for UWB secure distance measurement.

PRIOR ART

UWB secure distance measurement is well known. A verifier V sends in an UWB channel a challenge message C1 with a challenge pulse sequence Nv to a prover P which sends a response message R1 with a response pulse sequence Np in the UWB channel back to the verifier V as shown in FIG. 1. Due to the verifier time difference DTv between sending the challenge message C1 and receiving the response message R1, the time of flight of the two messages C1 and R1 can be determined and thus the distance between the verifier and the prover. Owing to the use of the UWB channel, the challenge pulse sequence Nv and the response pulse sequence Np can be sent with very short pulses of a length of 1-2 ns so that the distance between the verifier and the prover can be determined with a small error. The authenticity of the prover P can be verified based on the response pulse sequence Np and on authentication information. The authenticity of the prover P can be verified by the verifier V for example with authentication information transmitted from the prover P to the verifier. This authentication information comprises for example the Nv received at the prover P, the response pulse sequence Np transmitted and a message authentication code (MAC) of the received Nv and the transmitted Np using a shared secret key K. This authenticated message is not time critical and can be sent by the prover using the UWB channel or out-of-band (oob) channel, typically a narrow-band channel for data communication. In modern cars an UHF (315/433 MHZ) narrowband channel is used.

The challenge message C1 and the response message R1 require in addition to the pulse sequences Nv and Np further additional message information which makes the transferred UWB messages much longer than the Nv and Np. As shown in FIG. 2, any message transmitted in a UWB channel (or any other channel) requires in the physical layer PHY of the OSI model a synchronization header SHR, a physical header PHR and in the physical payload P the data to be transmitted. In the messages exchanged for measuring the distance measurement, P contains the challenge/response pulse sequence. The physical payload comprises normally information about the source address, the destination address (also known as MAC header (MHR)), the service set identifier (SSID) and for the distance measurement the pulse sequence Np or Nv. When the secure distance measurement protocol requires in addition to exchange certain information, e.g. for authentication, like the encrypted response pulse sequence Np, the encrypted Nv or the encrypted SSID, the UWB messages get even longer.

While the UWB channel has the advantage of the wide bandwidth for generating very short impulses for the precise determination of the distance and for the security of the measurement against malicious third parties, it has also some disadvantages. One major disadvantage is the high power consumption of the UWB communication especially at the receiver which needs to sample the received signal at a very high sampling rate to catch/capture the fast varying signal enabled by the large bandwidth of the UWB channel of large bandwidth of the UWB channel. An UWB receiver consumes in the same time around ten times more than a narrowband receiver (NB) on a similar carrier frequency. Therefore, even if the UWB channel can be used as a data exchange link, normally it is tried to send all data which are not relevant for the distance measurement via a separate out of band message O (typically a narrowband data link) as shown in FIG. 1. One advantage of the out of band O message is that this allows to correct bit errors in the Nv and/or Np during the UWB exchange and therefore increase the performance of the ultra-wideband measurement. The out of band message O is transferred thus via a separate communication channel which requires less power to transfer the data and may have more robust data communication capabilities. Normally a NB channel, e.g. with a UHF carrier frequency is used, or 2.4. GHz Bluetooth (BT) or Zigbee. This reduces the power consumption significantly. However, this has the disadvantage that the secure distance measurement requires not only a UWB communication chip, but also a NB communication chip like a BT or Zigbee chip. This increases the constructional complexity for the secure distance measurement and the coordination complexity between the different communication chips. In addition, the existing NB channels like BT or Zigbee are very slow and have a large communication management overload which makes the coordination with the UWB very difficult.

Since the power consumption of the receiver depends also on the carrier frequency of the message, some secure distance protocols like in US2020/198580 use a wake-up message W at a low frequency (LF) carrier frequency with a NB bandwidth which is sent from the verifier V to the prover P shortly before the UWB challenge message C1 is sent to the prover. Thus, a LF-NB receiver at the prover P can listen continuously for the wake-up message W with a very low power consumption. Once the wake-up message W is received, the UWB receiver is switched on in the prover and listens for the arrival of an UWB message as the prover expects the UWB message C1. The time uncertainty between the message W and Cl is between 1 milliseconds (ms) and 100 ms, the UWB receiver at the prover is switched on for a long time, maybe even longer than the UWB message C1 itself. The same happens also at the verifier V which needs to wait for the response message R1 from the prover P.

For regulatory reasons, the link budget of each UWB channel is limited. This means that in a certain time, the transmitted energy of an UWB channel is limited. The energy corresponds to the power of the UWB channel multiplied with or integrated over the time. More precisely, each 1 ms the energy of each UWB channel cannot exceed a maximum energy (also called the link budget). Within this period of 1 ms, the energy can be freely distributed as long as it does not exceed the maximum energy. Shorter UWB messages requiring less UWB pulses can thus be transmitted with a higher power, while often longer UWB messages with a larger number of pulses can only be transmitted with a lower power of the individual pulses. This makes it more difficult to receive such longer UWB pulses as their pulses are hidden in the noise. Thus, UWB messages using the same link budget having more pulses sent at a lower power make normally the reception of the UWB message harder for longer distances and noisy environments. Thus, the heavier the header part of the UWB message, the less of the available link budget (energy) remains for the UWB data part. However, the header part of the UWB message is essential to receive and decode the UWB message at the receiver. This is a second reason why it is tried to transfer as much data as possible in the oob channel, preferably a NB channel and to transfer only the absolutely essential header information in the UWB message itself. Transferring too many data in UWB channel causes longer UWB messages which either increases the power consumption or reduces the available link budget for the distance measurement. A reduced link budget for the distance measurement means that the range of the distance measurement is reduced.

US2019/195982A1 discloses a distance measurement between different vehicles of a platoon. In order to avoid that UWB distance measurement messages are sent at the same time from different vehicles of the platoon, an OOB channel is used to synchronize the clocks of the vehicles.

BRIEF SUMMARY OF THE INVENTION

It is the object of the invention to provide protocol for an UWB distance measurement which avoids the problems of the state of the art, in particular which reduces the high-power consumption of the UWB distance measurement, reduces the latency of the distance measurement and/or increases the link budget available for the distance measurement.

According to the invention, this object is solved by the independent claims.

According to the invention, this object is solved by a method for transceiving a message for UWB distance measurement, comprising the steps of: transceiving a first information portion via a narrowband channel, and transceiving after the first information portion a second information portion via a UWB channel, wherein the second information portion comprises a distance pulse sequence being a pulse sequence to be used for distance measurement.

According to the invention, this object is solved by a device for transceiving a message for UWB distance measurement, comprising: a transceiver configured to transceiving a first information portion via a narrowband channel and to transceiving after the first information portion a second information portion (B) via a UWB channel, wherein the second information portion comprises a distance pulse sequence for distance measurement.

According to the invention, this object is solved by a message protocol for UWB distance measurement, the message comprising in the physical layer a frame with: a first information portion (A) including synchronization information, after the first information portion (A), a second information portion (B) comprising a distance pulse sequence (N, Nv, Np) to be used for distance measurement, wherein the first information portion (A) is transmitted via a narrowband channel, and the second information portion (B) is transmitted via a UWB channel.

According to the invention, this object is solved by a method for UWB distance measurement comprising the step of transceiving in the UWB frequency spectrum an information portion, or by a device for transceiving a message for UWB distance measurement, comprising: a transceiver configured to transceiving in the UWB frequency spectrum an information portion, or by a message protocol for UWB distance measurement with an information portion transceived in the UWB frequency spectrum. The information portion comprising a distance pulse sequence. The information portion comprises a plurality (at least two) information sub-portions, wherein the information sub-portions are transceived in different UWB frequency-time portions, wherein the UWB frequency-time portion is defined as a portion of the UWB frequency-time domain limited by the link budget of the UWB channel.

The dependent claims and the subsequent embodiments refer to further advantageous realisations of the above inventions.

In one embodiment, the first information portion and the second information portion are transceived in a common message frame of the message. The use of a common frame with a first information portion transceived in an NB channel and a second information portion transceived in the UWB portion, allows to avoid the SHR of the UWB messages and reduce the sent UWB pulses just to the ones essential for the distance measurement. All other information relevant for the distance measurement can be sent in the same frame in the first information portion via the NB channel which is much more power efficient. Even if the first information portion transmitted via the NB channel, allows a less precise time of arrival estimation (precision of around hundreds of nanoseconds (ns)) than the SHR of a classic UWB message (precision of 1-2 ns), the coarse time of arrival from the first information portion of the NB channel allows to know with a precision of around some 100 ns, when the second information portion in the UWB channel will be received at the receiver. When waiting for an independent UWB message package, the receiver waits normally between 1 and 100 ms, thus three orders of magnitudes more than in the present invention. The inventors found out that this waiting period for the UWB messages was one of the principal reasons for the high-power consumption of the UWB distance measurement and with the present invention the power consumption could be reduced by a factor hundred to thousand (depending on the application). In addition, the UWB synchronization is not necessary any more which was even more power hungry than a normal UWB signal sampling, because receiver had to run continuously a correlation mask over the received signal during the complete waiting time in search for the UWB signal. With the coarse synchronization of the NB channel, the second information portion can be directly sampled and processed by the UWB receiver without the need of the power intensive UWB synchronization. Also, for the transmitter, this format has major advantages. Since the SHR and the PHR of the UWB signal can be avoided, the available energy in a certain time period can be used to transmit UWB pulses which are only dedicated to distance measurement with a higher amplitude so that the available range of the distance measurement is increased.

In one embodiment, the steps of transceiving the first information portion (A) via the narrowband channel and transceiving after the first information portion (A) the second information portion (B) via the UWB channel means: Either a transmitter (TX) is transmitting the first information portion (A) via the narrowband channel and the transmitter (TX) is transmitting after the first information portion (A) the second information portion (B) via the UWB channel; or a receiver (RX) is receiving the first information portion (A) via the narrowband channel and the receiver (RX) is receiving after the first information portion (A) the second information portion (B) via the UWB channel.

In one embodiment, the second information portion is transceived in a time period after the first information portion defined by the common message frame. This allows to know based on the first information portion quite precisely, when the second information portion shall be expected.

In one embodiment, the transceived message is a received message received at a receiver, the receiver switches on the circuitry for receiving the UWB based on the time period defined by the common message frame after the first information portion has been received.

In one embodiment, when the transceived message is a received message received at a receiver, the receiver determines a clock offset based on the first information portion, wherein the clock-offset defines the offset of the system clock of the receiver from a system clock of a transmitter of the message, wherein the receiver detects the second information portion of the message using the system clock of the receiver and the clock-offset determined based on the first information portion. The clock-offset between the system clock of the receiver and the system clock of the transmitter leads to different length and/or different and continuously shifting carrier phase of a symbol of the message transmitted at the transmitter and expected at the receiver, if not considered at the receiver. The clock-offset can be determined more precise in the narrowband channel than in the UWB channel. The precise clock-offset determined in the narrowband channel allows the receiver to receive in the UWB channel data without any prior synchronization in the UWB channel itself. This allows to reduce the header information of the UWB part of the message which frees link budget for the distance pulse sequence transmitted in the UWB channel.

In one embodiment, when the transceived message is a received message received at a receiver, the receiver determines a clock offset based on the first information portion and adapts the system clock of the receiver based on the determined clock-offset, wherein the receiver detects the second information portion of the message using the system clock of the receiver adapted based on the clock-offset determined based on the first information portion.

In one embodiment, the second information portion is transceived in the UWB channel without a message portion header comprising a preamble, a start of frame delimiter and packet header. This reduces the header information of the UWB part of the message which frees link budget for the distance pulse sequence transmitted in the UWB channel.

In one embodiment, the first information portion comprises an information about the length of the second information portion allowing to determine the end of the transceived message in the UWB channel.

In one embodiment, the first information portion is transceived by the same chip, by the same antenna and/or by the same transceiving circuit as the second information portion.

In one embodiment, the narrowband channel has a carrier frequency between 5 GHz and 6 GHz or between 8.5 GHz and 9 GHz and the UWB channel has a carrier frequency between 6 GHz and 8.5 GHz.

In one embodiment, the narrowband channel has a carrier frequency which has a frequency distance of less than 2 GHZ from the carrier frequency of the UWB channel. Having a similar carrier frequency for the narrowband channel and the UWB channel allows to use the same antenna.

In one embodiment, the first information portion comprises a service set identifier.

In one embodiment, the first information portion comprises a distance pulse information in encrypted form, wherein the distance pulse information allows to retrieve the distance pulse sequence.

In one embodiment, the second information portion comprises a plurality (at least two) second information sub-portions, wherein the second information sub-portions are transceived in different UWB frequency-time portions, wherein each different UWB frequency-time portion is defined as a portion of the UWB frequency-time domain limited by the link budget and/or having an independent link budget. Since two different UWB frequency-time portions have each an independent link budget, the two different UWB frequency-time portions allow to send together the energy of two times the link budget LB in the UWB frequency-time domain.

In one embodiment, the different UWB frequency-time portions are different UWB sub-channels.

In one embodiment, two different UWB frequency-time portions can be two different link budget (time) slots. This embodiment can also be combined with the previous one.

In one embodiment, the distance pulse sequence comprises at least two distance pulse sub-sequences, wherein each distance pulse sub-sequence is transceived in a different one of the (second) information sub-portions. This allows to transmit the distance pulse sequence in the UWB spectrum with an energy larger than the link budget.

In one embodiment, the different distance pulse sub-sequences are the same in (each of) the different (second) information sub-portions and/or are fixed/period pulse sequences. This allows to increase the robustness of receiving the distance pulse sequence. The UWB signals of the different distance pulse sub-sequences can be added up to increase the signal portion within the noise.

In one embodiment, the different distance pulse sub-sequences are different in the different (second) information sub-portions.

In one embodiment, the (second) information portion comprises a security pulse sequence for providing secure distance measurement, wherein the security pulse sequence is distinct from the distance pulse sequence. The security pulse sequence and the distance pulse sequence do not contain preferably any common parts. The distance pulse sequence is used at the receiver to determine the time of arrival of the distance pulse sequence, while the security pulse sequence is used to verify the security of the time of arrival measurement. The receiver decodes a pulse sequence in the received UWB signal at the time the security pulse sequence is expected based on the time of arrival measurement from the distance pulse sequence. This embodiment combines the advantage of fixed/periodic distance pulse sequences for distance measurement and secure distance measurement. The linkage of the security pulse sequence to the estimated time of arrival based on the distance pulse sequence distinct from the security pulse sequence allows to have a fixed/periodic distance pulse sequence on the one side but verifying the security of the distance measurement based on the security pulse sequence. This embodiment is particularly advantageous when the distance pulse sequence and the security pulse sequence are sent in different (second) information sub-portions sent in different UWB frequency-time portions, because then the UWB message length is not any more limited to the link budget and the increased number of pulses/bits necessary for this embodiment is not any more a problem. The security pulse sequence is preferably a random number (nonce) as commonly used in secure distance measurement.

In one embodiment, the security pulse sequence a plurality of security pulse sub-sequences transceived in different (second) information sub-portions. The different security pulse sub-sequences are distinct from each other.

In one embodiment, the plurality of (second) information sub-portions comprises a first group of (second) information sub-portions (at least one) in which each (second) information sub-portion comprises the distance pulse sequence (or one of the distance pulse sub-sequences) and a second group of (second) information sub-portions (at least one) in which each (second) information sub-portion comprises the security pulse sequence (or one of the security pulse sub-sequences). In one embodiment, the first group and the second group can be non-overlapping such that the (second) information sub-portions of the first group transceive distance pulse (sub-)sequences (without security pulse (sub-) sequences) and such that the (second) information sub-portions of the second group transceiver security pulse (sub-)sequences (without distance pulse (sub-) sequences). In another embodiment, the first group and the second group can overlap such that the (second) information sub-portions being in both groups transceive the distance pulse (sub-) sequence and the security pulse (sub-) sequence. In one embodiment, the first group and second group can be identical such that all (second) information sub-portions transceive each one of the distance pulse sub-sequences and one of the security pulse sub-sequences.

In one embodiment, the (second) information sub-portions are transceived in a common message frame and/or in the same message.

In one embodiment, the (second) information sub-portions are transceived in separate/distinct messages.

In one embodiment, the message(s) with the (second) information sub-portions can have either a message header (first information portion) transceived in the narrowband channel or a message header in an UWB channel. In the latter case, the message header can be sent in the same UWB channel as the UWB frequency-time portion of the starting (second) information sub-portion or also in a distinct UWB frequency-time portion in order not to waste the link budget of the UWB frequency-time portions in which the (second) information sub-portions are transceived.

In one embodiment, the UWB channel has at least two different UWB sub-channels, wherein the distance pulse sequence is divided in a at least two distance pulse sub-sequences, wherein the at least two distance pulse sub-sequences are transceived in either at least two second information sub-portions of the second information portion transceived at least two different UWB sub-channels or in at least two messages each comprising the first information portion and the second information portion, wherein the second information portions of the at least two messages comprising each one of the at least two distance pulse sub-sequences are transceived at at least two different UWB sub-channels. The use of different UWB sub-channels consecutively allows to exploit the maximum transmit energy permitted by the regulatory limits in a different frequency band to make multiple distance estimations at different frequencies within the shortest duration. This improves the energy efficiency and accuracy and reliability of the distance measurement due to the frequency diversity.

In one embodiment, the second information portion comprises at least two second information sub-portions which are transceived in the at least two different UWB sub-channels, wherein the first second information sub-portion is transmitted in a first UWB sub-channel and the second second information sub-portion is transmitted in a second UWB sub-channel different from the first sub-channel. Preferably, each different second information sub-portions has a well-defined time relationship with at least one of the first information portion or one of the previous second information sub-portions. Preferably, the at least two second information sub-portions transceived in the at least two UWB sub-channels have a absolute phase alignment (with respect to the carrier frequencies of the UWB sub-channels). Preferably, the distance pulse sequence is distributed over the at least two second information sub-portions. Preferably, a receiver prepares a combined signal comprising the at least two second information sub-portions in the time relationship as received and measures the distance or time of arrival of the message based on the combined signal, preferably by a correlation of the combined signal with an expected signal pattern.

In one embodiment, at least two messages each comprising a first information portion transceived in an NB channel and a second information portion transceived in an UWB channel, wherein each second information portion of the at least two messages comprises one of the at least two distance pulse sub-sequences, wherein the second information portions of the at least two messages are transceived at the at least two different UWB sub-channels. Preferably, the at least two second information portions transceived in the at least two UWB sub-channels have a absolute phase alignment (with respect to the carrier frequencies of the UWB sub-channels). Preferably, a receiver prepares a combined signal comprising the at least two second information sub-portions in the time relationship as received and measures the distance or time of arrival of the at least two messages based on the combined signal, preferably by a correlation of the combined signal with an expected signal pattern.

In one embodiment, a method for distance measurement between a verifier and prover comprising the following steps: sending a first message with a first pulse sequence from the verifier to the prover; sending a second message with a second pulse sequence from the prover to the verifier; and measuring the distance between the verifier and the prover based on the verifier time difference between sending the first message from the verifier and receiving the second message at the verifier; wherein the first message and/or the second message is transmitted based on the method described above.

In one embodiment, the distance pulse sequence of the second information portion of the first message is the first pulse sequence and/or the distance pulse sequence of the second information portion of the second message is the second pulse sequence.

In one embodiment, the first information portion of the second message comprises a prover time information, wherein the prover time information indicates the time between the receiving of the first message at the prover and the sending of the second message from the prover, wherein the distance between the verifier and the prover is determined based on the verifier time difference and the prover time difference.

In one embodiment, the first message is a challenge message and the first pulse sequence is a challenge pulse sequence, wherein the second message is a response message and the second pulse sequence is a response pulse sequence, wherein a secure distance measurement is performed by authenticating in the verifier the authenticity of the prover based on the response pulse sequence.

In one embodiment, the second pulse sequence is a periodic pulse sequence known at the verifier.

In one embodiment, the device comprises a transceiving circuit configured to be operated in a narrowband mode and in a UWB mode.

In one embodiment, the device comprises a transceiving circuit comprising an oscillator configured to generate a carrier signal. Preferably, the oscillator is configured to generate in the narrowband mode a first carrier signal for the narrowband channel as the carrier signal of the oscillator and in the UWB mode a second carrier signal for the UWB channel as the carrier signal of the oscillator. In a less preferred embodiment, the same carrier signal is used for the UWB mode and the narrowband mode.

In one embodiment, the device comprises a transceiving circuit comprising a signal generator configured to modulate the carrier signal from the oscillator to generate a modulated radio signal. Preferably, the signal generator is configured in the narrowband mode to modulate a narrowband signal and/or the first information portion on the carrier signal received from the oscillator and in the UWB mode to modulate an UWB signal and/or the second information portion on the carrier signal received from the oscillator. To use the same oscillator for creating the narrowband signal and the UWB signal allows to estimate the clock-offset for the UWB signal in the narrowband signal.

In one embodiment, the device comprises a transceiving circuit comprising a transmission amplifier configured to amplify the modulated radio signal.

In one embodiment, the device comprises a transceiving circuit comprising an antenna configured to transmit the (amplified) modulated radio signal and/or configured to receive a radio signal.

In one embodiment, the device comprises a transceiving circuit comprising a receiving amplifier configured to amplify the radio signal received at the antenna.

In one embodiment, the device comprises a transceiving circuit comprising a mixer configured to downmix the received/amplified radio signal with a carrier signal obtained from an oscillator. Preferably, the oscillator is configured to generate in the narrowband mode a first carrier signal for the narrowband channel as the carrier signal of the oscillator and in the UWB mode a second carrier signal for the UWB channel as the carrier signal of the oscillator. Preferably, the same oscillator as for the transmission is used.

In one embodiment, the device comprises a transceiving circuit comprising a filter configured to generate a filtered signal by in the narrowband mode filtering out from the downmixed amplified radio signal the frequencies outside of the narrowband channel and in the UWB mode filtering out from the downmixed amplified radio signal the frequencies outside of the UWB channel.

In one embodiment, the device comprises a transceiving circuit comprising an analogue to digital converter configured to convert filtered/downmixed/amplified/received signal into a digital signal. Preferably, the analogue to digital converter uses in the narrowband mode a first sampling frequency and in the UWB mode a second sampling frequency, wherein the first sampling frequency is lower than the second sampling frequency.

In one embodiment, the device comprises a transceiving circuit comprising a digital processor configured to process the digital signal.

Such a transceiver circuit allows to use the same transceiver components for the UWB channel and the NB channel which makes the existing chips for UWB distance measurement much more simple as the separate circuit for the NB channel can be omitted.

In one embodiment, the transceiving circuit, preferably the complete prover or verifier, is realised in one semiconductor chip.

Other embodiments according to the present invention are mentioned in the appended claims, the subsequent description of

BRIEF DESCRIPTION OF THE DRAWINGS

In the drawings, the same reference numbers have been allocated to the same or analogue element.

FIG. 11 shows an exemplary time order of a pulse sequence with equidistant pulses.

FIG. 12 shows an exemplary time order of a pulse sequence with bursts.

FIG. 13 illustrates the concept of the link budget of an UWB message.

FIG. 14 is an illustration of a second embodiment of a system with a transmitter and a receiver for distance measurement and of the method for transmitting a message for distance measurement and of the protocol for a message for distance measurement according to the invention.

FIG. 15 is an illustration of a third embodiment of a system with a transmitter and a receiver for distance measurement and of the method for transmitting a message for distance measurement and of the protocol for a message for distance measurement according to the invention.

FIG. 16 shows a second sub-embodiment of the second embodiment shown in FIG. 14.

FIG. 17 shows a second sub-embodiment of the third embodiment shown in FIG. 15.

FIG. 18 shows a third sub-embodiment of the second embodiment shown in FIG. 14 combining the first and second sub-embodiments.

FIG. 19 shows a table with different embodiments for the content of the different second information sub-portions of the second and third embodiment.

FIG. 20 shows an exemplary first embodiment of information sub-portions transceived in different UWB frequency-time portions, with the message header transceived in the UWB spectrum.

FIG. 21 shows an exemplary second embodiment of information sub-portions transceived in different UWB frequency-time portions, with the message header transceived in the UWB spectrum.

DETAILED DESCRIPTION OF AN EMBODIMENT OF THE INVENTION

Other characteristics and advantages of the present invention will be derived from the non-limitative following description, and by making reference to the drawings.

In the following some terms used in here are defined.

A message is a data unit in the physical layer of the OSI model. In other words, a message is a data unit transmitted over a communication channel, in this invention via a radio communication channel, wherein the data unit has a common organization. This organization of the message is called frame. The message comprises normally at the beginning some information allowing the detection of a message, the determination of the clock offset, the determination of the frequency offset and/or the synchronization of the receiver with respect to the received message. The message contains normally further information regarding the sending device (origin) and the receiving device (destination) so that the receiver knows, if the message is for indeed addressed to the receiver. Otherwise, it can ignore the message. Depending on the message protocol, the administration information is more complex or simpler. This administrational information holds for the complete data transmitted in the message. A new message comprises again the administrational information and is thus completely independent from the previous message. Two messages are independent from each other in relation to the data transmitted, but also in relation to the timing of the transmission. A new message requires a new synchronization on the new message. Traditionally, a message is transmitted in the same communication channel. In the present invention, the message is transmitted in two subsequent different communication channels as will be explained in more detail below.

Figure 1:
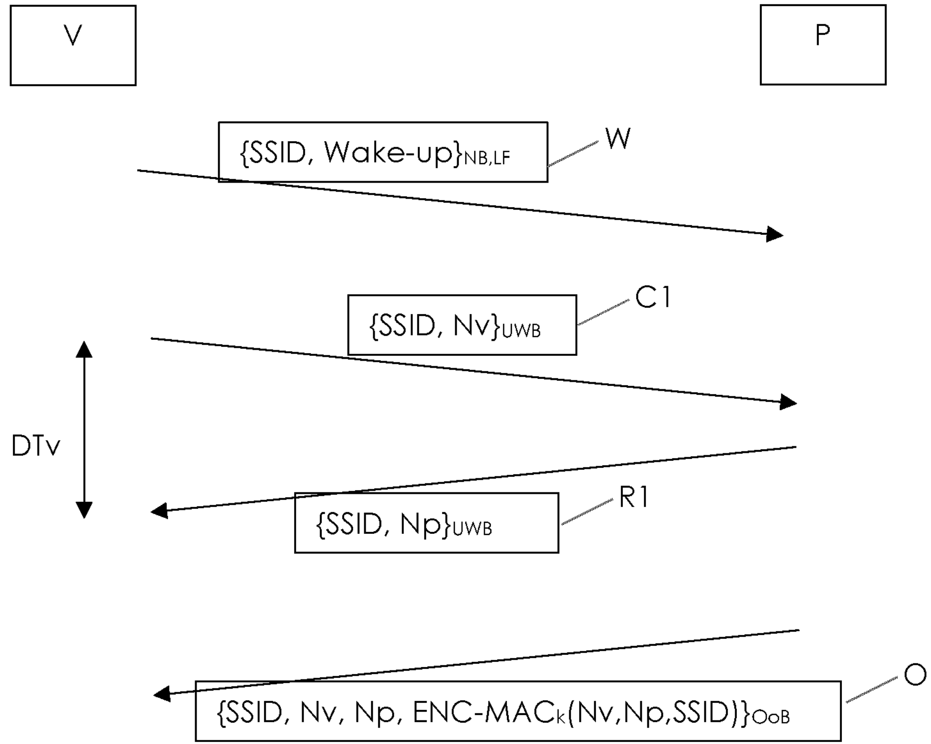
FIG. 1 is a schematic diagram illustrating an embodiment of the prior art of secure distance measurement.
Figure 2:
FIG. 2 is an illustration of a frame in the physical layer for an UWB message or an NB message according to the prior art.

A frame is the definition arrangement of the data transmitted in the message. FIG. 2 shows an example definition of a frame of a message in the physical layer. The frame in the physical layer comprises a synchronization header SHR, a packet header PHR and a physical payload P. The synchronization header comprises a synchronization pattern which in NB is often called PREAMBLE and in UWB is often called SYNC. The terms PREAMBLE and SYNC are used interchangeable in here. After the synchronization pattern, the synchronization header SHR comprises often a start of frame delimiter SFD. The PHR comprises normally the length of the message so that the receiver will know, when the message/frame has ended. The physical payload comprises the transmitted data. The SHR and PHR are for the physical layer, i.e. for the receiving chip to identify a message in the received signal of the communication channel. The physical payload comprises normally another frame of the next higher OSI model layer, the data link layer, often referred as the MAC frame. The MAC frame comprises a MAC header MHR with communication management information about the sender, the receiver, the network connection, etc. The MAC payload comprises the data which should be transmitted. Even if this is a preferred organisation of the transmitted frame, other organizations are possible.

The message and/or frame is physically transmitted over a communication channel (short channel), in this invention via a radio communication channel. The radio communication channel comprises a radio signal with transmitting the message has preferably a bandwidth. The bandwidth according to the invention is either a UWB or a NB. The UWB has preferably a bandwidth of 50 MHz and more, even more preferably a bandwidth of 100 MHz and more, even more preferably a bandwidth of 200 MHz or more, even more preferably a bandwidth of 300 MHz or more, even more preferably a bandwidth of 400 MHz or more, most preferably a bandwidth of 500 MHz or more. The NB has a bandwidth that does not significantly exceed the channel's coherence bandwidth, i.e. is less than the coherence bandwidth of the channel. The NB has preferably a bandwidth smaller than 50 MHZ, preferably smaller than 20 MHZ, preferably smaller than 10 MHZ, preferably smaller than 5 MHz, preferably smaller than 1 MHz, preferably smaller than 500 Hz. The data or bits of the message frame are transmitted by symbols. One symbol transfers normally one or a plurality of bits depending on the modulation scheme. It is also possible that a bit sequence transmits one bit. While a NB symbol (symbol of a NB channel) can be transferred over an unlimited time, but preferably long enough for high symbol energy, a UWB symbol is transferred in a short time period with a high instantaneous power. The UWB symbol can be for example some hundreds of ns long or even some microseconds, but the UWB pulses that are forming the UWB symbol are only a few ns long. The radio signal has a carrier frequency on which the message is transmitted. While traditionally, the NB carrier frequencies used for oob messages are in the ultra high frequency (UHF) band (below 3 GHZ) and the UWB carrier frequencies are in the super high frequency (SHF) band (above 3 GHZ). Preferably, in the present invention the carrier frequency of the NB channel is larger than 2.4 GHz, preferably larger than 2.5 GHZ, preferably, larger than 3 GHZ, preferably larger than 5 GHZ. Preferably, the carrier frequency of the NB channel is chosen in vicinity of the carrier frequency of the UWB channel so that the same antenna and the same transceiver components can be used for the NB and UWB channel. Preferably, the carrier frequency of the NB channel is closer to carrier frequency of the UWB channel than 2 GHZ, preferably than 1 GHZ, preferably than 500 MHZ. Theoretically, also the same carrier frequency could be used for the NB and the UWB channel. However, for regulatory purposes, different carrier frequencies are preferred. The UWB channel can comprise different UWB sub-channels.

For the sake of brevity, the term transceive is used in here as replacement for the term transmit and/or receive so that everything needs to be explained only once for the transmission and the reception process. A message is transceived can thus mean that the message is received or the message is transmitted. The term transceiver shall mean receiver and/or transmitter. Thus, a transceiver could be a pure receiver, a pure transmitter or a combined transmitter and receiver. Normally, a combined transmitter and receiver is preferred.

A distance pulse sequence is a sequence of UWB pulses used at the receiver to measure a time of arrival of a received message. The time of arrival of the received message can be used to calculate a time of flight, a time between sending of a previous message and the time of arrival measured (e.g. a verifier time difference) or a time between the time or arrival measured and a time a subsequent message is sent out (e.g. a prover time difference). This time of arrival measurement is sometimes also called timestamping of the received message. So, other UWB pulses or NB symbols transmitted before or after the distance pulse sequence not directly used to measure the time of arrival are not considered as distance pulse sequence. In a secure distance measurement, the distance pulse sequence is a challenge pulse sequence in a challenge message and a response pulse sequence in a response message. For secure distance measurement, the distance pulse sequence is often a random pulse sequence or a quasi random pulse sequence. In a "simple" distance measurement application, the distance pulse sequence can be also a periodic sequence of UWB pulses which reduces the complexity to detect the distance pulse sequence and to measure the time of arrival. The periodicity of such a periodic sequence of pulses can be either that the same pulse is repeated or a pulse code comprising a plurality of pulses is repeated periodically (e.g., Ipatov code, Gold code). The distance pulse sequence is normally a translation of a transmitted distance bit sequence into the corresponding distance pulse sequence. Mostly, the number of UWB pulses correspond to the number of bits of the distance bit sequence as when using binary shift keying. However, the number of pulses can also be higher than the number of bits like when using spreading codes. Also, the order of the bits or spreading codes corresponds normally to the order of pulses of the distance pulse sequence. However, it is also possible to rearrange the order of the bits (or of the chips of the spreading code) in the distance pulse sequence like for example in WO2017/121452.

The distance pulse sequence is in most cases transceived by an equidistant sequence of pulses 41 which are transmitted equidistantly, i.e. with the same time difference between all pulses of the distance pulse sequence like shown in the example of FIG. 11. However, the distance pulse sequence can also be transmitted with another time order than in FIG. 11. An alternative is for example to transceive the pulses 41 of the distance pulse sequence in pulse groups 42 as shown in FIG. 12, i.e. as a group pulse sequence. The group 42 comprise at least two pulses 41. The group pulse sequence comprises a sequence of at least two groups (plurality of groups). The time difference between two subsequent pulses 41 of the same group 42 is smaller than the time difference TG between two subsequent groups 42. The pulses 41 of the same group 42 are normally sent shortly one after the other. Preferably, subsequent pulses 41 of the same group 42 have a time difference among them which is smaller than ten times the duration of the pulse 41, preferably than 8 time, preferably than 6 times preferably than 5 times, preferably than 4 times, preferably than 3 times the duration of the pulse 41. The time difference among subsequent pulses shall be the time difference between the same characteristic point of the respective pulses 41, e.g. the peak of the pulses 41. The pulse duration is for example 2 ns and the pulses in the group 42 of pulses 41 is sent every 4 ns. Often the group 42 of pulses 41 is a symbol for a bit, also called a burst or a spread code. The pulses 41 of this symbol or group 42 are often also called chips. Such a spread code or burst 42 facilitates the reception of the transmitted bit sequence as the transmission energy for each bit is increased by a factor of the number of chips per symbol. However, the longer the symbol length becomes, the higher is the risk for a manipulation of the time of arrival by a malicious third party. Therefore, the pulses 41 are preferably sent as close together as possible to make a manipulation of the time of arrival as hard as possible. The group pulse sequence has the further advantage that the grouping of the pulses 41 leads to larger time differences between the groups 42 which avoids in environments with long channel impulse responses that the previous group 42 creates noise for the subsequent group. This facilitates the reception of the signal a lot and avoids complex and power consuming post processing of the received signal to filter out the channel impulse response.

In some embodiments, especially for secure distance measurement, the distance bit sequence behind the distance pulse sequence must be transmitted again in a NB channel (see below). We use the term distance pulse information as any information allowing to determine the distance bit sequence or the distance pulse sequence from the distance pulse information. The distance pulse information is normally the distance bit sequence itself. The distance pulse information can however be also a any other information allowing to retrieve the distance pulse sequence. This can be for example a seed information allowing to retrieve the distance bit sequence or the distance pulse sequence. This is for example advantageous, when very long distance pulse sequences are used. The distance pulse information distinguishes further from the distance pulse sequence that the distance pulse sequence is used to measure the time of arrival of the message, while the distance pulse information is not time relevant. The distance pulse sequence is always transmitted in the UWB channel. If the distance pulse information is transmitted, it is preferably transmitted in the NB channel.

Figure 3:
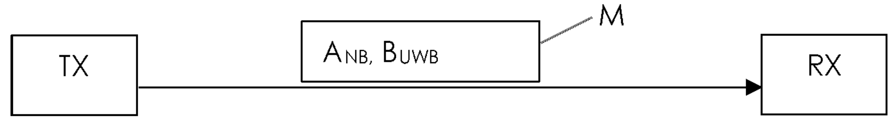
FIG. 3 is an illustration of a first embodiment of a system with a transmitter and a receiver for distance measurement and of a first embodiment of a method for transmitting a message for distance measurement and of a first embodiment of a protocol for a message for distance measurement according to the invention.

FIG. 3 shows protocol of the message M according to the invention. The message M contains in a common frame a first information portion A and a second information portion B. The first information portion A is transceived in a NB channel, while the second information portion B is transceived in a UWB channel. Preferably, the first information portion A is intended as the complete information of the message M transferred in the NB channel (before the second information portion) and the second information portion B is intended the complete information of the message M transferred in the UWB channel. In a preferred embodiment, the message M does not comprise other portions than the first information portion A and the second information portion B so that the message consists of the first information portion A and of the second information portion B. However, it is also possible in another embodiment that a third information portion is transmitted after the second information portion in the NB channel. This would for example allow to improve the time resolution of the receiver based on the second information portion B which is transmitted with the timely more precise UWB channel before transmitting again information in the NB channel in the same common frame.

The first information portion A is transceived before the second information portion B. Preferably, the second information portion B is transceived after the first information portion A has been transceived fully, i.e. after the end of the first information portion A has been transceived, the second information portion B is transceived.

Preferably, the second information portion B has a well-defined time relationship with respect to the first information portion A. The well-defined time relationship allows a receiver receiving the message M with the common frame to know based on the time of receiving the first information portion in the NB channel and based on the well-defined time relationship to know/calculate the expected arrival of the second information portion B. The well-defined time relationship is preferably a fixed time period between the end of the first information portion A and the beginning of the second information portion B. In one embodiment, the symbol length of the NB channel of the first information portion A and the symbol length of the second information portion B can be equal, so that the UWB symbols of the second information portion can be arranged in multiples of the symbol length after the NB symbols of the first information portion A. The fixed time period between the end of the first information portion A and the beginning of the second information portion B can be for example a multiple of the length of the symbol length of the NB channel of the first information portion, e.g. n symbol lengths after the last NB symbol of the first information portion, the first UWB symbol could be transceived. n can be 0, 1, 2, 3. However, this is just one simple realisation. It is also possible that the NB symbol length has a know relationship to the UWB symbol length, so that the second information portion has a known relationship to the first information portion.

Other fixed time periods are possible. The receiver will thus know based on the fixed time relationship after the last NB symbol of the first information portion has been received, (or after any other defined time point of the first information portion), when he needs to expect the first UWB symbol of the second information portion, i.e when it needs to switch on the UWB channel receiver. The fixed time period can be defined in the protocol or standard for the message according to the invention. Due to the use of the same/common frame for the NB and the UWB channel and/or due to the fixed time period, the uncertainty when the first UWB symbol or UWB pulse in this UWB symbol arrives can be reduced from several tenths of microseconds to some hundreds of nanoseconds which reduces the power consumption of the UWB receiving period dramatically. Instead of a fixed time period, also any other well-defined time relationship between the first and second information portion A and B can be use. For example, the information about the time relationship between the portions A and B can be transmitted in the first information portion A. Due to the common frame and the well-defined time relationship, the expected time of arrival of the second information portion in the UWB channel can be determined with a precision below one microsecond, preferably below 500 ns, preferably below 400 ns, preferably below 300 ns. Thus, a receiver RX will know quite precisely when the first UWB pulse will be received. Making the time difference between the portions A and B too big could result in synchronization information from first portion to 2nd portion that are not reliable (eg. because of unmonitored drifts in-between the two portion).

The first information portion A comprises preferably a synchronization information, preferably a synchronization header SHR as in classical frames as shown in FIG. 2. The synchronization header or the synchronization information comprises preferably the preamble and the SFD. As explained above, the SHR or the preamble can used at the receiver for one or more of the following purposes: to detect the message M in the NB channel, to synchronize the receiver RX with the message M, to determine the clock-offset and to determine the frequency offset. The clock-offset and the frequency offset are strictly related. A transmitter, receiver or transceiver has normally one oscillator defining the clock of the transmitter, receiver or transceiver. This clock or oscillator is used to create the carrier frequency and to decide the time of transmission or reception of a bit, pulse or symbol of the signal. Subsequently, the clock-offset shall include also the frequency-offset as the frequency-offset can be calculated from the clock-offset and vice versa.

The receiver RX can for example detect a message M in the received NB channel by correlating the received signal of the NB channel with a reference signal which corresponds to a radio signal containing the synchronization information, the SHR and/or the preamble. When the correlation gets high, the receiver knows that a message M is received. Due to the longer symbols in the time domain and the sharper frequency shape of the symbols and due to a higher transmission amplitude, it is much easier, less power consuming and less error-prone to detect the message M in in the NB channel than the detection of a message or SHR in the UWB channel.

The receiver RX can then synchronize on the receive message M based on the detected synchronization information, SHR and/or preamble. The synchronization allows to determine, when the symbols of the synchronization information, the SHR and/or the preamble have arrived and thus to determine, when future symbols of the same common frame will arrive.

The receiver RX determines a clock offset based on the first information portion A. Contrary to the time of arrival of a NB message, the clock-offset between the receiver RX and the transmitter TX can be determined even more precisely than from an UWB message. The receiver RX preferably determines from the synchronization information, the SHR and/or the preamble the clock offset. The clock offset defines the offset of the system clock of the receiver RX from the system clock of the transmitter TX. The system clock is defined by its frequency, i.e. the frequency of a clock oscillator in the receiver RX/transmitter TX. When the transmitter TX has a different system clock (than the receiver), the symbol can differ in length (time drift) and carrier phase (phase rotation) between the transmitter and the receiver, thus reducing the link budget and the maximum range of the communication. Thus, if the clock offset is not considered at the receiver, this leads to a different length and/or different carrier phase of a symbol of the message M transmitted at the transmitter TX and expected at the receiver RX. Therefore, it is important for the receiver to know the clock offset so that his time reference when a symbol is expected to be received at the receiver based on the synchronization above does not drift due to the different system clocks. It also important for the receiver to synchronize on the phase of the transmitter such that demodulation performance is not degraded in a coherent signalling scheme. Therefore, the receiver RX detects the second information portion B of the message M using the system clock of the receiver RX and the clock-offset determined based on the first information portion A. Either the receiver RX adapts based on the clock offset the system clock of the RX and detects the second information portion B based on the adapted system clock. Or the receiver RX post-processes the UWB signal with the second information portion B based on the determined clock-offset.

The receiver RX can also determine the frequency offset for the frequency of the carrier signal. The frequency offset can be determined from the determined clock-offset or vice versa. The receiver RX can then adapt the frequency of its oscillator for generating the carrier signal by the determined frequency offset. The first information portion A comprises preferably further a PHR. The PHR comprises preferably the information about the length of the message M so that the receiver RX will know, when the last symbol of the message has been received and the message M has ended. In one embodiment, the PHR could comprise just the length of the full message M or any other information allowing the determination of the full length of the message M. In a preferred embodiment, the PHR could comprise the information of the length of the first information portion A (or any other information allowing to determine the length of the first information portion A) and the length of the second information portion B. Thus, the physical layer in the receiver RX could already determine from the PHR when the first information portion A ends, thus when the second information portion B starts and thus, when the receiving mode of the UWB receiver must be switched on. However, it is also possible to include the information about the length of the first information portion A in the remaining first information portion A, e.g. in the physical or MAC payload P.

The rest of the message M contains the physical payload P. The physical payload is divided in the first information portion physical payload P1 defining the remain data of the first information portion A and in the second information portion B. Thus, the physical payload of the same message M or of the same frame is transferred in two different communication channels, the NB channel and the UWB channel which is a unique concept in radio communication.

In a less preferred embodiment, the first information portion physical payload P1 can also be omitted and the fully physical payload P is transmitted in the second information portion or the UWB channel.

The first information portion A (physical payload) comprises preferably (at least a part of) a Media Access Control (MAC) frame. The MAC frame comprises normally a MAC header (MHR) at the beginning of the MAC frame, the MAC payload and a MAC footer at the end of the MAC frame. The MHR is preferably the first information transmitted in the first information portion physical payload. The MHR contains normally communication management information like for example frame control counter, sequence number, source address, destination address and/or other communication management information. The MAC footer can be transmitted as last information of the first information portion A or as last information of the second information portion B. This depends, how the frame of the message M is defined, if the MAC frame extends over both channels or only over the NB channel/first information portion A.

The first information portion A (physical payload), preferably the MAC payload comprises the information which shall be exchanged with the message M, preferably further non time relevant distance measurement information like one or more of a SSID, a distance pulse information and the prover time difference.

Figure 5:
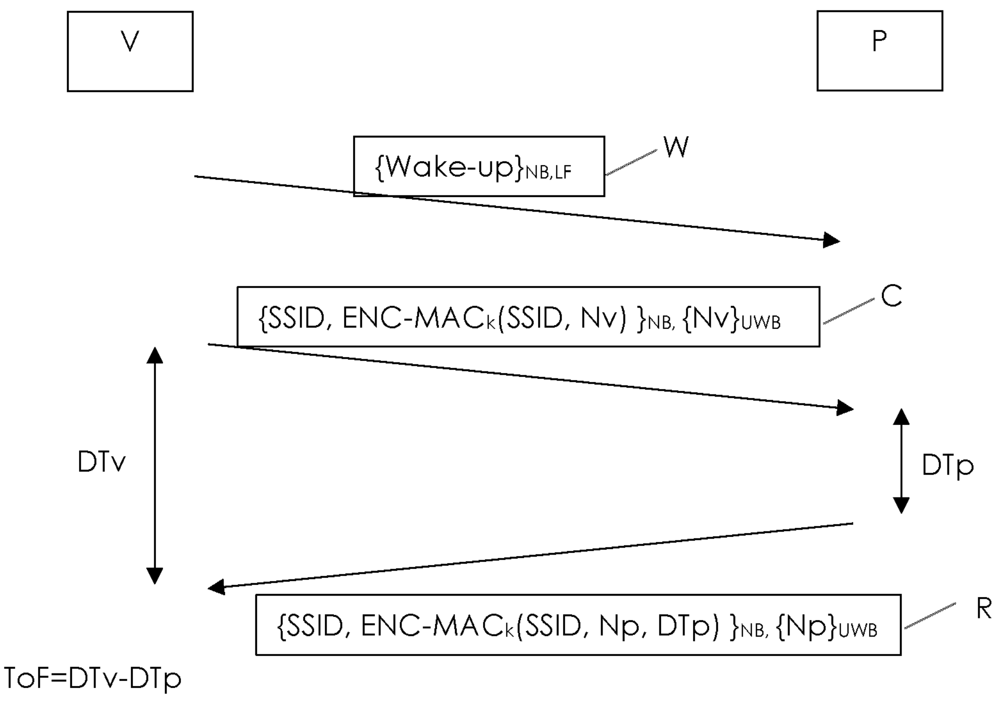
FIG. 5 is a first embodiment of a system, method, verifier and prover for secure distance measurement use the message protocol according to the invention.

An example of such messages M for secure distance measurement is shown in FIG. 5 the messages C or R. There, the first information portion physical payload P of the messages C and R comprises the SSID and the distance pulse information. The first information portion physical payload P1 of the message R comprises further the prover time difference. The SSID is preferably transmitted once in clear format (that means not encrypted) and another time in encrypted form. The SSID in encrypted form allows to verify that the sender had the correct encryption key and/or to verify that the SSID in clear format was not manipulated by a malicious third party. However, this is not essential and the SSID could also be transferred just in clear format and/or just in encrypted format. Instead of the SSID, another connection identifier could be transceived.

Figure 6:
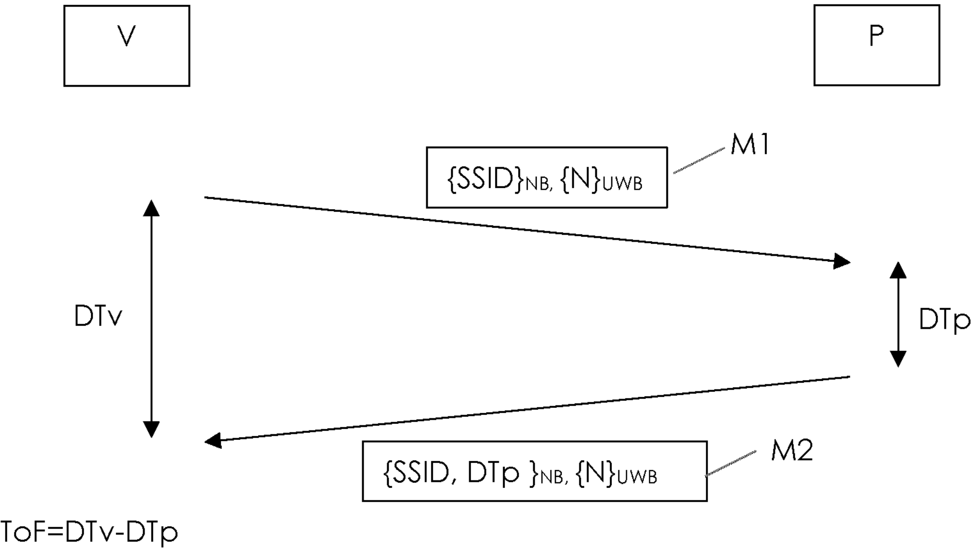
FIG. 6 is a second embodiment of a system, method, verifier and prover for distance measurement according to the invention.

An example of such a message for "simple" (or non secure) distance measurement is shown in FIG. 6 with the messages M1 and M2. Here, the non time relevant distance measurement transmitted in the message M1 from the verifier to the prover P is the SSID. The non time relevant distance measurement transmitted in the message M2 from the prover P to the verifier V is the SSID and the prover time difference DTp. The encrypted information for the verification is not necessary anymore.

The distance pulse information is preferably transceived in the first information portion A (physical payload P1) allowing the receiver RX to verify the received distance pulse sequence in the UWB channel based on the received distance pulse information of the NB channel. The distance pulse information is in FIG. 5 transceived as the distance pulse bit sequence Np underlying the distance pulse sequence N or Np. In a simpler embodiment like in FIG. 6, the distance pulse sequence can be a fixed distance pulse sequence. This means that the transmitter sends for each distance measurement the same fixed distance pulse sequence to the receiver RX which is well known by the receiver RX in advance. In this case, the distance pulse information must not be transmitted in the first information portion A. The fixed distance pulse sequence is preferably a periodic pulse sequence.

The prover time difference DTp is illustrated in the example embodiments of FIGS. 5 and 6. The prover time difference DTp is the time difference between the time of transmitting the message R, M2 from the prover P to the verifier V and the time of arrival of the message C, M1 from the verifier V at the prover P. The time of arrival is measured based on the time of arrival of the distance pulse sequence N, Np of the second information portion B of the message M1, C.

Figure 4:
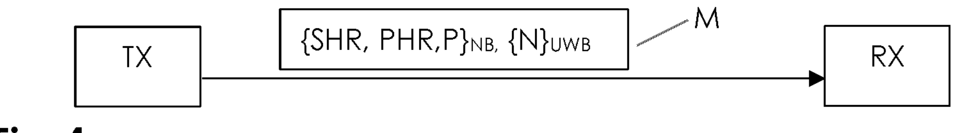
FIG. 4 is a more detailed embodiment of the embodiment of FIG. 3.

The second information portion B comprises the distance pulse sequence N as shown in FIG. 4. While a state-of-the-art UWB message requires to transfer in the UWB channel the SYNC, SFD, PHR and MAC frame before sending the distance pulse sequence, in a preferred embodiment, the second information portion B does not comprise a separate/full UWB message header with one or more of a preamble (equivalent to SYNC), SFD, PHR, MHR and SSID. This reduces the number of pulses transmitted in the UWB channel significantly and/or allows to increase the link budget of the distance pulse sequence of the message M which allows more robust distance measurement. The link budget of the distance pulse sequence could be increase by using a distance pulse sequence with a higher number of pulses and/or by using a higher power/amplitude for sending the pulses of the distance pulse sequence. In one embodiment, the second information portion B comprises only the distance pulse sequence which allows for example to use the full available link budget for the distance pulse sequence. In another embodiment, other information can be transceived in the second information portion B than the pure distance pulse sequence. For example, a reduced UWB message header can be sent within the second information portion B as well. This reduced UWB message header could comprise just the SYNC pattern or even a reduced SYNC pattern. This can be used to improve the synchronization of the receiver RX on the message M, because the UWB pulses allow a synchronization up to some nanoseconds, while the NB symbols allow only a synchronization of some hundreds of nanoseconds. The reduced UWB message header could then be used to improve the synchronization of the receiver RX on the message M which was performed on (the synchronization information of) the first information portion A. In one embodiment, the second information portion B is transceived in the UWB channel without a message portion comprising a preamble, a start of frame delimiter SFD and packet header PHR. This message portion including the preamble, SFD and PHR which according to the standard is placed at the beginning of each UWB message is missing in the second information portion B. Thus, this message portion is not sent in the UWB channel. This embodiment without this message portion shall not exclude a second information portion B comprising a reduced UWB message header not containing at least one of the preamble, SFD and PHR. The reduced UWB message header could serve to make a re-synchronization on the UWB channel with a higher precision. The synchronization on the first information portion A would then give a coarse synchronization, and the synchronization on the reduced UWB message header could provide a precise synchronization. For example, the second information portion could have just the preamble. In another embodiment, second information portion B does not include at least one of the preamble, SFD and PHR, preferably does not include at least two of the preamble, SFD and PHR, preferably does not include all three of the preamble, SFD and PHR.

FIG. 13 tries to illustrate this problem of the available link budget for UWB messages. The UWB standard foresees that the transmission energy of the UWB signal in this UWB channel is limited to a link budget LB corresponding to a certain transmission energy. The transmission energy is defined by the integral of the power of the UWB signal over time. In FIG. 13, the x-axis shows the time and the y-axis the (average) power of the UWB signal in this UWB channel. The link budget LB is defined with respect to the time period $T_{LB}$ of a link budget slot $S_{LB}$. The time period $T_{LB}$ is preferably 1 ms. The illustration of the time is only schematic and the relation between the length of the messages Ma, Mb, Mc and the length of the time period $T_{LB}$ do not correspond to the reality. Thus, in each link budget slot $S_{LB}$, i.e. in each subsequent time period $T_{LB}$, the maximum energy available in this UWB channel is LB. The message Ma in the link budget slot $S_{LB1}$ for example does not use the full link budget LB available in this slot. The message Mb in the link budget slot $S_{LB2}$ uses the full link budget LB available in this slot. Also, the message Mc in the link budget slot $S_{LB3}$ for example uses the full link budget LB available in this slot using a longer message with a lower average power. The lower average power can be provided by placing the pulses of the same power at longer time differences between them or by sending the pulses with a lower power (at the same time difference). Thus, the UWB standard provides flexibility about the energy distribution of the UWB pulses over time as long as the link budget LB is not exceeded. This provides the flexibility (e.g. when the signal to noise ratio is low) to send a message with low power pulses with a high number of pulses to send a large amount of data and (e.g. when the signal to noise ratio is high) to send a message with high power but few pulses or to send a message with low power but redundant pulses. In the state of the art of distance measurement, the available energy for the distance pulse sequence is limited by the energy which remains available for the MAC payload of the UWB message. This available MAC payload of the UWB message corresponds to the link budget LB minus the energy used for the SHR, PHR and the MAC header. This is currently the limiting factor for UWB distance measurement in noisy environments and/or for long distances.

By transmitting as much as possible information in the first information portion A, i.e. in the NB channel, the second information portion B or UWB channel has more energy available for transmitting the distance pulse sequence. While the state of the art did only move data from the MAC payload into the OOB channel, the present invention maximizes the available energy of the distance pulse sequence by transferring part or all of the formal message portion of the UWB message in the first information portion A, i.e. in the narrowband channel. The receiver can detect the second portion B of the UWB channel due to the first information portion A. This maximizes the available energy for the distance pulse sequence in the UWB channel. In addition, it allows to avoid the power intensive synchronization of the receiver on the UWB message. The increase of the available energy for the distance pulse sequence allows already to make the distance measurement much more robust such that the UWB distance measurement can be used also for longer distances and for noisier environments. Nevertheless, the energy of the distance pulse sequence transmitted is limited always to the maximum link budget of the UWB channel.

Figures 7, 8, 9, 10:
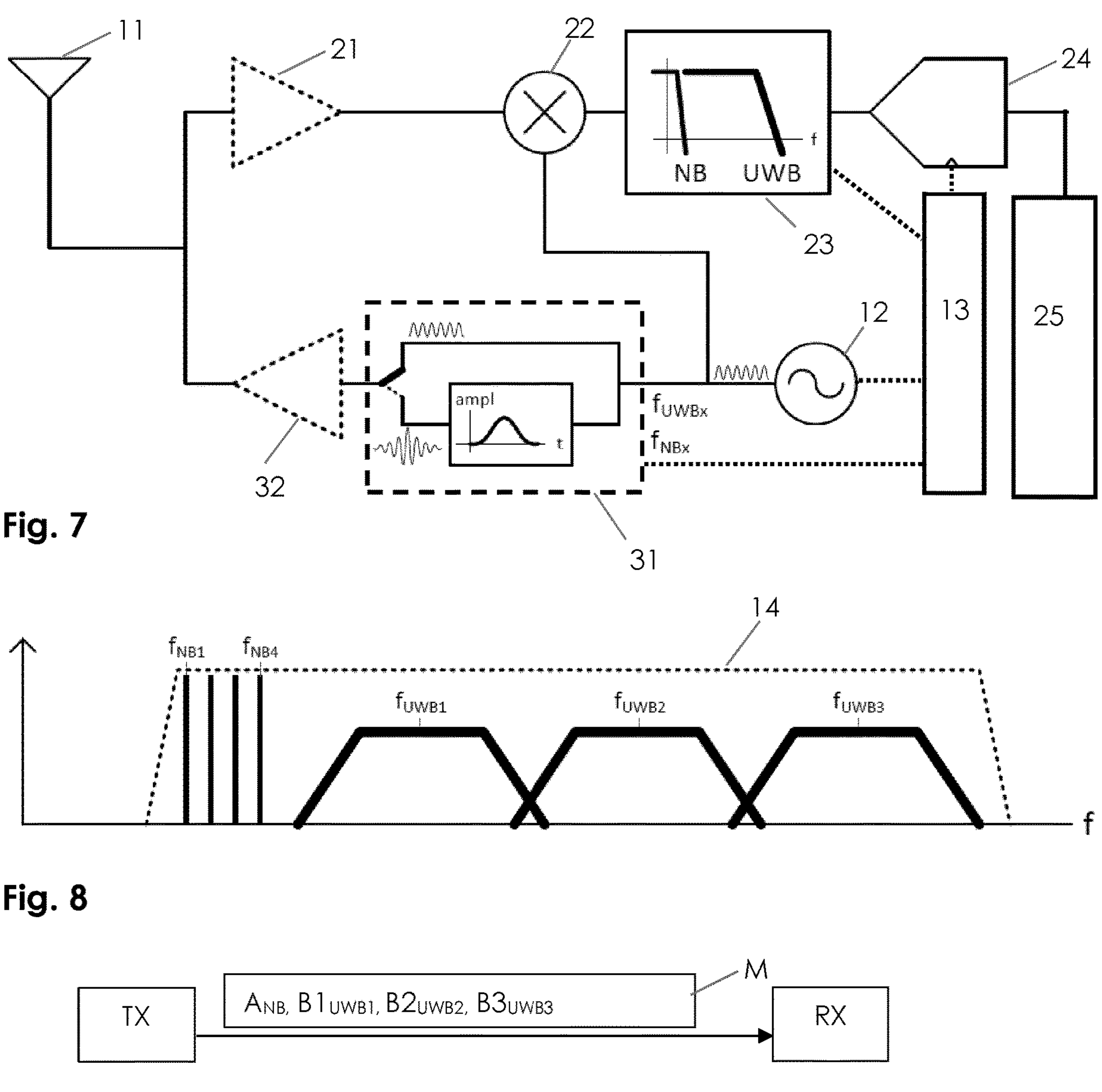
FIG. 7 is an embodiment for a circuit diagram for a transceiver according to the invention.
FIG. 8 is an example spectrum of the UWB channel and the NB channel.
FIG. 9 shows a first sub-embodiment of the second embodiment shown in FIG. 14.
FIG. 10 is shows a first sub-embodiment of the third embodiment shown in FIG. 15.

An embodiment to increase the link budget over this regulatory limit is shown in FIG. 14. In this embodiment the second information portion B comprises at least two second information sub-portions B1, B2, B3. The distance pulse sequence comprises at least two distance pulse sub-sequences. Preferably, each distance pulse sub-sequence is transceived in a different second information sub-portion B1, B2, B3. There might however be more second information sub-portions B1, B2, B3 than distance pulse sub-sequences so that at least one of the second information sub-portions B1, B2, B3 do not contain a distance pulse sub-sequence. The second information sub-portions B1, B2, B3 and/or the distance pulse sub-sequences are transceived in different UWB frequency-time portions LB1, LB2, LB3. One UWB frequency-time portion LB1, LB2, LB3 is defined as a portion of the UWB frequency-time domain limited by the link budget LB. Two different UWB frequency-time portions have thus each an independent link budget LB so that the two different UWB frequency-time portions allow to send together the energy of two times the link budget LB in the UWB spectrum. Two different UWB frequency-time portions can be two different UWB sub-channels UWB1, UWB2, UWB3 (as shown in FIG. 9, 10) or two different link budget (time) slots $S_{LB1}$, $S_{LB2}$, $S_{LB3}$. (as shown in FIG. 16, 17) or a combination of both (as shown in FIG. 18). The first information portion A (transceived in the NB channel) and the at least two different second sub-portions B1, B2, B3 (transceived in the at least two UWB frequency-time portions LB1, LB2, LB3) are preferably transceived in one common frame (as shown in examples FIGS. 9, 14, 16, 18, 19 and 20). The distance pulse sequence is preferably divided into at least two distance pulse sub-sequences which are each transmitted in a different one of the at least two second information sub-portions B1, B2, B3. Two subsequent different second information sub-portions B1, B2, B3 transceived at different UWB frequency-time portions LB1, LB2, LB3 have preferably a well-defined time and/or (absolute) phase relationship among them. The well-defined time relationship between the different subsequent second information sub-portions B1, B2, B3 is like the well-defined time relationship between the first information portion A and the second information portion B and is for the sake of brevity not repeated. Since the regulatory limit for the link budget holds only for each UWB frequency-time portion LB1, LB2, LB3, the second information portion B=B1, B2, B3 transceived in the UWB frequency-time domain can be transceived in different (subsequent) UWB frequency-time portions LB1, LB2, LB3 so that the second information sub-portions B1, B2, B3 of each UWB frequency-time portion LB1, LB2, LB3 can each use the full link budget. Thus, for n different second information sub-portions B1, . . . , Bn sent at n different UWB frequency-time portions LB1, LB2, LB3, the available UWB link budget for the full second information portion B is n times larger. This allows much larger distance ranges and more robustness in noisy and multipath environments. Compared to different link budget slots, the different UWB sub-channels have the advantage that the message duration can be significantly reduced. In addition, different UWB sub-channels are more robust for situations where one channel might show more noise than the other UWB sub-channels.

FIG. 15 shows a further embodiment of the invention similar to the embodiment of FIG. 14. Instead of transceiving the at least two different distance pulse sub-sequences in different second information sub-portions of the same message M, they (the at least two different distance pulse sub-sequences and/or the at least two different second information sub-portions B1, B2, B3) are transceived in at least two different messages MI, MII, MIII. Thus, the sub-portions B1, B2, B3 corresponds to the second information portion B of the respective messages MI, MII, MII as defined in FIG. 3. Each of those at least two messages MI, MII, MIII is transceived with a first information portion A in the NB channel and with a second information (sub-)portion B1, B2, B3 in the respective UWB frequency-time portion LB1, LB2, LB3. Two subsequent different messages MI, MII, MII, preferably their second information portions B1, B2, B3 have preferably a well-defined time and/or (absolute) phase relationship among them. The first information portion A can be the same for each message MI, MII, MIII or could be reduced for the messages MII, MIII after the first message MI. Preferably, the receiver RX will synchronize with each first information portion A of each message to avoid drifts over long time periods.

It is also possible to combine the embodiment of FIG. 14 and FIG. 15 such that a first message is transceived with a first information portion A transceived in the NB channel, a first second information sub-portion B1 transceived in a first UWB frequency-time portion LB1 and a second second information sub-portion B2 transceived in a second UWB frequency-time portion LB2, and that a second message is transceived with a first information portion A transceived in the NB channel, a third second information sub-portion B3 transceived in a third UWB frequency-time portion LB3 and a fourth second information sub-portion B4 transceived in a fourth UWB frequency-time portion LB4. This might avoid problems with drift, when many second information sub-portions are transceived within the same message frame.

In both embodiments of FIGS. 14 and 15, the different distance pulse sub-sequences are transceived (via different second information sub-portions B1, B2, B3 of the same message M or via the second information portions B1, B2, B3 of different messages MI, MII, MIII) and a combined signal with the respective distance pulse sub-sequences at the respective receiving times are generated. The distance measurement or the time of arrival of the message(s) is then performed based on the combined signal, preferably via a correlation with respect to an expected receiving pattern.

The first information portion A, the PHR, the first information portion physical payload P1, the SSID or the MAC payload can comprise information about the length and/or type of UWB frequency-time portion LB1, LB2, LB3 of the sub-portions.

FIGS. 8 to 10 show the embodiment with different UWB sub-channels UWB1, UWB2, UWB3 as different UWB frequency-time portions LB1, LB2, LB3.

In FIG. 9, the second information portion B is transceived in different UWB sub-channels UWB1, UWB2, UWB3. The second information portion comprises at least two second information sub-portions B1, B2, B3 which are transceived in at least two different UWB sub-channels UWB1, UWB2, UWB3. The at least two UWB sub-channel UWB1, UWB2, UWB3 are different. The at least two UWB sub-channels UWB1, UWB2, UWB3 have preferably different carrier frequencies $f_{UWB1}$, $f_{UWB2}$, $f_{UWB3}$. The at least two UWB sub-channels are preferably non-overlapping. An example of three different non-overlapping UWB sub-channels UWB1, UWB2, UWB3 is shown in FIG. 8. The first second information sub-portion B1 is transmitted in a first UWB sub-channel UWB1 and the second second information sub-portion B2 is transmitted in a second UWB sub-channel UWB2 different from the first sub-channel UWB1. The first information portion A and the at least two different second sub-portions B1, B2, B3 are transceived in one common frame. The distance pulse sequence is preferably divided into at least two distance pulse sub-sequences which are each transmitted in a different one of the at least two second information sub-portions B. Two subsequent different second information sub-portions transceived at different UWB sub-channels have preferably a well-defined time and/or (absolute) phase relationship among them. The well-defined time relationship between the different subsequent second information sub-portions B is like the well-defined time relationship between the first information portion A and the second information portion B and is for the sake of brevity not repeated. Since the regulatory limit for the link budget holds only for each UWB sub-channel, the second information portion B=B1, B2, B3 transceived in the UWB channel can be transceived in different (subsequent) UWB sub-channels so that for the information sub-portions B1, B2, B3 of each UWB sub-channel can each use the full link budget. Thus, for n different second information sub-portions B1, . . . , Bn sent at n different UWB sub-channels, the available UWB link budget for the full UWB-channel is n times larger (if the different UWB sub-channels do not overlap). This allows much larger distance ranges and more robustness in noisy and multipath environments. In addition, the UWB frequency diversity can increase the robustness of the distance measurement, when one UWB channel is particularly noisy, and improves thus the precision of the distance measurement.

FIG. 10 shows a further embodiment of the invention similar to the embodiment of FIG. 9. Instead of transceiving the at least two different distance pulse sub-sequences in different second information sub-portions, they are transceived in at least two different messages MI, MII, MIII, in particular in the second information portion B1, B2, B3 of the respective messages MI, MII, MII. Each of those at least two messages is transceived with a first information portion A in the NB channel and with a second information portion B in the UWB channel, preferably each second information portion B1, B2, B3 in a different UWB sub-channel UWB1, UWB2, UWB3. Two subsequent different messages MI, MII, MII, preferably their second information portions B1, B2, B3 have preferably a well-defined time and/or (absolute) phase relationship among them. The first information portion A can be the same for each message MI, MII, MIII or could be reduced for the messages MII, MIII after the first message MI. Preferably, the receiver RX will synchronize with each first information portion A of each message to avoid drifts over long time periods.

In both embodiments of FIGS. 9 and 10, the different distance pulse sub-sequences are received (via different second information sub-portions B1, B2, B3 of the same message M or via the second information portions B1, B2, B3 of different messages MI, MII, MIII) and a combined signal with the respective distance pulse sub-sequences at the respective receiving times are generated. The distance measurement or the time of arrival of the message(s) is then performed based on the combined signal, preferably via a correlation with respect to an expected receiving pattern.

The first information portion A, the PHR, the first information portion physical payload P1, the SSID or the MAC payload can comprise information about the length and/or sub-channel of the first information portion A and of the second information portion or sub-portions. If the message protocol/transceiver supports different UWB sub-channels, the first information portion A, the PHR, the first information portion physical payload P1, the SSID or the MAC payload can comprise the length and UWB sub-channel of each second information sub-portion B1, B2, B3. The length of the last second information sub-portion B3 can be omitted, if this information can be obtained otherwise, e.g. from the total length of the message. With a well-defined time period between the end of each first information portion A or second information sub-portion and the sub-sequent second information sub-portion, this information would allow the receiver to switch on the correct UWB sub-channel at the correct time, when the respective second information sub-portion is to be expected. When the message M comprises a second information portion B transceived only in one UWB sub-channel, this information would be transmitted only for the one second information portion B1 so that the receiver RX can switch into the correct UWB sub-channel. The first information portion A, the PHR, the first information portion physical payload P1, the SSID or the MAC payload can comprise the length and/or NB sub-channel of the first information portion. When the receiver or message protocol supports different NB sub-channels (as shown for example in FIG. 8), the used NB sub-channel in the first information portion A is determined based on the current state of the art. There are different schemes for detecting the NB sub-channel used for a message M. One is indeed the receiver to listen to all NB channels, another is to have some dynamic channel selection scheme/protocol.

FIGS. 16 to 17 show the embodiment with different link budget slots $S_{LB1}$, $S_{LB2}$, $S_{LB3}$ as different UWB frequency-time portions LB1, LB2, LB3. In FIGS. 14 and 15, the different second information sub-portions B1, B2, B3 are sent in different link budget slots $S_{LB1}$, $S_{LB2}$, $S_{LB3}$. The time between two subsequent second information sub-portions B1, B2, B3 (transceived in the same UWB channel) are $T_{LB}$ or more. This allows to have in the same UWB channel again the full link budget available. In the embodiment of FIG. 16, the second information sub-portions B1, B2, B3 are transceived in the same common message frame defined by the first information portion A transceived in the NB channel. In the embodiment of FIG. 17, the sub-portions B1, B2, B3 are transceived in different messages MI, MII, MIII, each message MI, MII, MIII comprising the first information portion A transceived in the NB channel and one to the second information sub-portions B1, B2, B3, respectively. The same as for the embodiments of FIGS. 9 and 10 applies, respectively, for the embodiments of FIGS. 16 and 17, the only difference is that instead of different UWB frequency channels UWB1, UWB2, UWB3, different link budget slots $S_{LB1}$, $S_{LB2}$, $S_{LB3}$ are used. The use of different link budget slots $S_{LB1}$, $S_{LB2}$, $S_{LB3}$ allow to increase the available link budget for the distance pulse sequence without using different UWB frequencies. This makes the transceiver design less complex. However, the long time between two subsequent link budget slots $S_{LB1}$, $S_{LB2}$, $S_{LB3}$ might lead to drift problems which make the receiving of the second information sub-portions B2, B3 of the second and/or subsequent link budget slot difficult. Therefore, the embodiment of FIG. 17 might be preferred.

In one embodiment, the different UWB frequency-time portions LB1, LB2, LB3 comprise at least two UWB sub-channels UWB1, UWB2 and at least two different link budget (time) slots $S_{LB1}$, $S_{LB2}$ as shown for example in FIG. 18. This embodiment combines the advantages of both types of UWB frequency-time portions. As described above, the second information sub-portions B1, B2, B3 transceived in a different UWB frequency-time portion LB1 (here UWB1-$S_{LB1}$), LB2 (here UWB2-$S_{LB1}$), LB3 (here UWB1-$S_{LB2}$) can be transceived in a common message frame as shown in FIG. 18 or in FIG. 14 or can be transceived in different messages MI, MII, MIII as shown in FIG. 15. As described above, it is also possible to mix the embodiments of FIGS. 14 and 15, e.g. the second information sub-portions B1, B2 of the same link budget slot $S_{LB1}$ could be transceived in a common message frame, while the second information portion(s) B3 of the next link budget slot $S_{LB2}$ are transceived in another message.

FIG. 19 shows now different realization of the data transceived with the second information sub-portions B1, B2, B3, B4 in the respective UWB frequency-time portions LB1, LB2, LB3, LB4 for different embodiments illustrated in different rows.

In embodiment 1, the second information sub-portions B1, B2, B3, B4 comprise each a distance pulse sub-sequence corresponding to the same distance pulse sequence or distance bit sequence N. Thus, the different distance pulse sub-sequences are all the same. The time of arrival of the distance pulse sequence transceived via the message M (or the messages MI, MII, MIII) is determined based on the distance pulse sub-sequence N transceived multiple times in the different second information sub-portions B1, B2, B3, B4. Since the same distance pulse sub-sequence is sent in each second information sub-portion B1, B2, B3, B4, the UWB signals of the time windows when the second information sub-portions B1, B2, B3, B4 can be summed up so that the received symbols or pulses of the distance pulse sub-sequence sum up (phase coherent sum). This is possible, because the exact time difference between the second information sub-portions B1, B2, B3, B4 is known and the clock offset between the transmitter TX and the receiver RX is known. The expected signal for the distance pulse sub-sequence is then correlated to the sum of the signals of the different sub-portions B1, B2, B3, B4 (sum signal) to find the time of arrival of the message M. The correlation could be done by a cross-correlation function of the expected signal of the distance pulse sub-sequence with the sum signal. The sum signal might be different for each time difference of the cross-correlation function to respect the phase coherent sum of the sum signal for the respective time difference. This is just one embodiment to detect the time of arrival in the received signal and obviously other solutions are possible. However, this embodiment does not provide any security against attacks, because the attacker could listen to the first second information sub-portion B1 and send the subsequent equal second information sub-portions B2, B3, B4 earlier to fake the vicinity.

In embodiment 2, a distance pulse sequence N=(N1, N2, N3, N4) is divided into the different distance pulse sub-sequences N1, N2, N3, N4 and transceived with the different second information sub-portions LB1, LB2, LB3, LB4. The different distance pulse sub-sequences N1, N2, N3, N4 correspond to different distance bit sub-sequences. The distance pulse sequence N or the distance bit sequence N correspond to the nonce Nv or Np used by the prover P or verifier V for secure distance measurement as described for example in the embodiment of FIG. 5. This avoids that an attacker can anticipate the pulses but might create the problem that the individual pulses might not be correctly read in the noise. In such an embodiment, the number of pulses per UWB frequency-time portion LBi could be reduced so that the power of each individual pulse can be increased. The time of arrival could be determined based on the correlation of the UWB reference signals $S_{N1}$, $S_{N2}$, $S_{N3}$, $S_{N4}$ with the UWB signal received. The UWB reference signals $S_{N1}$, $S_{N2}$, $S_{N3}$, $S_{N4}$ correspond to the UWB signal expected for the respective distance pulse sub-sequences N1, N2, N3, N4. The correlation of each distance pulse sub-sequence N1, N2, N3, N4 provides a time of arrival ToA1, ToA2, ToA3, ToA4. The combination of the (four) time of arrivals ToA1, ToA2, ToA3, ToA4 provide the ToA of the distance pulse sequence N. Since an attacker does not know the distance pulse sub-sequences N1, N2, N3, N4, it is not possible to fake an earlier arrival of the distance pulse sequence N. The verification of the correct sequence N is automatically done by the correlation. However, other ToA detections and other verifications of N are possible. The distance pulse sequence N has thus the function of measuring the time of arrival and of authenticating the transmitter TX at the receiver RX.

In a preferred embodiment, the robustness of the embodiment 1 is combined with the security of embodiment 2. In this embodiment the at least two second information sub-portions B1, B2, B3, B4 comprise a distance pulse sub-sequence N transceived in at least one of, preferably at least two of the at least two second information sub-portions B1, B2, B3, B4 and a security pulse sequence SEC transceived in at least one of the at least two second information sub-portions B1, B2, B3, B4. The time of arrival of the distance pulse sequence transmitted via the message M (or the messages MI, MII, MIII) is determined based on the distance pulse sub-sequence N transceived in the at least one second information sub-portions B1, B2, B3, B4. Preferably, the same distance pulse sub-sequence N is transceived in at least two of the at least two sub-portions B1, B2, B3, B4 which allows to determine the time of arrival based on a (phase coherent) sum signal of the at least two sub-portions containing the same distance pulse sub-portion (as described for embodiment 1). The security pulse sequence SEC is a pulse sequence used at the receiver RX to verify the authenticity of the transmitter TX. This security pulse sequence SEC corresponds normally to a random bit sequence (also called nonce) used at the receiver RX to verify the transmitter TX. The security pulse sequence SEC corresponds normally to a pulse/bit sequence known only by the receiver RX and/or transmitter TX. Normally, the security pulse sequence SEC changes for each distance measurement. The security pulse sequence SEC is thus non-periodic and/or non-repetitive. The transceiver TX and the receiver RX have normally a security protocol to exchange the random bit sequence without allowing a third party to manipulate the transceived security pulse sequence SEC. This can be achieved by encrypting the exchanged random number or by simply sending the random number after having transmitted the security pulse sequence SEC. In this embodiment, a different pulse sequence is used for the time of arrival measurement (distance pulse sub-sequence N) and for the verification of the authenticity of the transmitter TX at the receiver RX (security pulse sequence SEC). The receiver RX verifies the authenticity of the transmitter TX by determining the time portion, when the security pulse sequence SEC should be received at the receiver RX based on the time of arrival determined from the distance pulse sequence (or sub-sequences) N. It is verified, if the UWB signal received at the determined time portion corresponds to the UWB signal expected for the security pulse sequence SEC in order to verify the authenticity of the transmitter TX at the receiver RX. If an attacker would anticipate the distance pulse sub-sequences N, the determined time portion based on the time of arrival would be as well anticipated and the UWB signal received at the determined time portion does not correspond to the true time portion, when the security pulse sequence SEC is arrived at the receiver RX. Thus, the receiver RX could not verify the authenticity of the transmitter TX, because the attacker had anticipated the time of arrival. This embodiment has the advantage that the time of arrival detection can be realized with a fixed, preferably a period distance pulse sequence which facilitates the time of arrival measurement significantly. By sending the fixed/periodic distance pulse sequence over several UWB frequency-time portions LB1, LB2, LB3, LB4, the robustness of the time of arrival or distance measurement is improved for noisy environments. Especially, when the fixed/periodic distance pulse sequence is transmitted repeatedly in several UWB frequency-time portions LB1, LB2, LB3, LB4, the robustness can be improved even further. By using a different message section, the security pulse sequence SEC, for the authenticity verification, but conditioning the verification to the time of arrival determined from the distance pulse sequence N, the time of arrival measurement can be made secure.

In embodiment 3, a first sub-group of at least two second information portions B1, B2, B3 comprise the (same) distance pulse sequence N, while a second sub-group of at least one second information sub-group B4 comprises the security pulse sequence. The second sub-group B4 can also comprise multiple second information sub-sections sent at different UWB frequency-time portions. The first sub-group and the second sub-group do not overlap.

In embodiment 4, the security pulse sequence comprises a plurality of security pulse sub-sequences SEC1, SEC2, SEC3, SEC4. Each security pulse sub-sequence SEC1, SEC2, SEC3, SEC4 is different. Each second information sub-portion B1, B2, B3, B4 comprises the same distance pulse sub-sequence N and a different one of the security pulse sub-sequence SEC1, SEC2, SEC3, SEC4.

In a preferred embodiment, the verification of the security pulse sequence SEC in the receiver RX allows preferably a certain error rate. The relation of the bit-length of the security pulse sequence SEC, the minimum security level required and the number of tolerated errors is related by a well-known equation. For example to achieve a minimum security level of 32 bit, a security pulse sequence SEC of 38 bits allows maximum 1 tolerated error, a security pulse sequence SEC of 42 bits allows maximum 2 tolerated error, a security pulse sequence SEC of 46 bits allows maximum 3 tolerated error, . . . a security pulse sequence SEC of 128 bits allows maximum 29 tolerated error, a security pulse sequence SEC of 256 bits allows maximum 78 . . . . This allows up to 29 errors in the detected security pulse sequence SEC of 128 bit in order to still achieve a security level of 32 bit. This allows to provide a secure distance measurement also in very noisy environments.

In all previously described embodiments, the message M or the message frame of the second information (sub-) portion B, B1, B2, B3, B4 was defined by at least one first information portion A transmitted in a NB channel. This is the preferred embodiment. The embodiments described in FIGS. 8 to 10 and 14 to 18 can however also be realized without the first information portion A transceived in the NB channel. For example, the header information H necessary for defining the message frame of the message M, MI, MII, MIII, MIV and/or for receiving the UWB message information portion B1, B2, B3, B4, can also be transceived in the UWB channel. The content of H can correspond to the content of A described above or only parts of the content of A. The content of the at least two (second) information sub-portions B1, B2, B3, B4 can be as described in the four embodiments described in the context of FIG. 19.

The header information H can for example be transceived in a first UWB frequency-time portion LB1, while the subsequent at least two (second) information sub-portions B1, B2, B3, B4 are transceived in at two further different UWB frequency-time portions LB2, LB3, LB4, LB5. The common message frame of the at least two information sub-portions B1, B2, B3, B4 are thus defined by the header information H transceived in the first UWB frequency-time portion. Such an example is shown in FIG. 20.

It is also possible that each information sub-portion B1, B2, B3, B4 is transceived in a separate message MI, MII, MIII, MIV, wherein each message MI, MII, MIII, MIV comprises its own header information H sent in the same UWB frequency-time portion LBi as the respective information portion Bi of the respective message MI, MII, MIII, MIV. Such an embodiment is shown in FIG. 21.

For all embodiments described, it was found that it is particularly advantageous to combine the described embodiments with distance pulse (sub-) sequences transceived as group pulse sequences as described above. This increases the detection rate of the distance pulse sequences in the noisy environments (due to an increased energy in a short time window and due to the reduced influence of the channel impulse response of the previous group of pulses) and reduces the power consumption. If the arrival of the group 42 of pulses 41 is known then the receiver only samples this period of time and stays idle between group of pulse (reducing the toggling activity of the digital receiver). This is why the group pulse sequences reduce the power consumption.

The transmitter TX and the receiver RX are preferably each a combined transmitter and receiver so that the transmitter TX can transmit the described message M and can receive the described message M and that the receiver RX can transmit the described message M and can receive the described message M. This allows a bi-directional communication between the transmitter TX and the receiver RX. However, it could also be possible to use a separate transmitter and receiver in the verifier V and the prover P. When we subsequently talk about a receiver RX, we mean either a combined transmitter-receiver working in receiving mode or a pure receiver. When we subsequently talk about a transmitter TX, we mean either a combined transmitter-receiver working in transmitting mode or a pure transmitter. The transceiver comprises preferably a NB mode to transceive in the NB channel and an UWB mode to transceive in the NB channel. The NB channel can comprise several NB sub-channels. The UWB channel can comprise different UWB channels.

The transmitter TX transmits the first information portion A in the NB channel. Then, the transmitter TX transmits the second information portion B in the UWB channel at the well-defined time relationship with respect to the first information portion A. So, preferably, the transmitter TX transmits the second information portion B in the UWB channel the fixed time period after the (last symbol of the) first information portion A has been sent in the NB channel. Since the UWB channel does not need the message communication information like SHR, PHR and/or the MAC frame, the second information portion B transmitted in the UWB channel is much shorter compared to traditional UWB messages which saves transmission energy and/or allows to increase the transmission power without exceeding the link budget. The transmitter TX switches preferably from a NB mode into an UWB mode, when the last symbol of the first information portion A has been transmitted. The first symbol/pulse of the second information portion B will be transmitted in the UWB channel at the time point defined by the well-defined time relationship of the second information portion B with respect to the first information portion A.

When the second information portion B comprises different second information sub-portions B1, B2, B3 transmitted in different UWB sub-channels UWB1, UWB2, UWB3, the transmitter TX will switch after the last symbol of the first information portion A has been transmitted into the first UWB sub-channel UWB1 of the first second information sub-portion B1, will switch after the last symbol of the first second information portion B1 has been transmitted into the second UWB sub-channel UWB2 of the second second information sub-portion B2 and (if there are further second information sub-portions) will switch after the last symbol of the second second information sub-portion B2 has been transmitted into the third UWB sub-channel UWB3 of the third second information sub-portion B2. The transmitter TX will transmit the first symbol of the first second information sub-portion B1 at the time point defined by the well-defined time relationship with respect to the first information portion A. The transmitter TX will transmit the first symbol of the second second information sub-portion B1 at the time point defined by the well-defined time relationship with respect to the first information portion A or the first second information portion B1. The transmitter TX will transmit the first symbol of the third second information sub-portion B1 at the time point defined by the well-defined time relationship with respect to the first information portion A or the first second information portion B1.

The receiver RX will listen for the arrival of the message M. When the receiver RX detects the synchronization information, in particular the preamble, it will preferably determine the clock offset with respect to the transmitter TX. Based on the determined clock offset and the time of arrival of the received synchronization information and/or preamble, the receiver RX can synchronize on the message M. This is normally done by adapting the system clock by the determined clock-offset before extrapolating the expected arrival times of the symbols of the message M or by post-processing of the received signal based on the determined clock-offset. Thus, the receiver RX will know, when the symbols of the message M will arrive. Based on the further information of the first information portion A, for example based on the PHR or further information in the first information portion physical payload P1, the receiver RX will know, when the first information portion A ends (e.g. how many symbols the first information portion A has) and when the second information portion B ends (e.g. how many symbols the second information portion B has). Thus, the receiver RX can determine based on the information when the first information portion A ends and based on the well-defined time relationship between the first information portion A and the second information portion B, when the first UWB symbol or pulse of the second information portion B is expected. Since the system clock of the receiver RX has been adapted by the clock offset determined based on the first information portion A received in the NB channel, also the time, when the first UWB symbol or pulse of the second information portion B of the message M depends on the clock offset determined based on the first information portion A. Thus, the receiver RX detects the second information portion B based on the system clock adapted with respect to (or synchronized on) the clock offset determined from the first information portion A. As mentioned instead of adapting the system clock by the clock-offset, the clock offset can also be considered by a post-processing of the received signal. The time, when the first UWB symbol or pulse of the second information portion B of the message is expected is preferably further based on the precision of the synchronization of the first information portion A in the NB channel. For example, when the precision of the synchronization in the NB channel is 200 ns, the time, when the first UWB symbol or pulse of the second information portion B is expected is 200 ns earlier to be sure that the UWB channel is already in the receiving/listening mode, when the first symbol of the second information portion B will be received. The receiver RX switches on the UWB receiving mode of the receiver RX, when the first UWB symbol or pulse of the second information portion B is expected. Due to the previous synchronization of the receiver RX to the message M in the NB channel, the UWB receiver in the receiver RX can switch on the UWB receiving mode precisely when the first UWB symbol or pulse will arrive. In the state of the art, when the oob information was transmitted in a separate message, it was not possible to know when the first UWB symbol would arrive. Therefore, the time of the UWB receiving mode waiting and listening for the UWB message to arrive was not predictable and takes normally between several milliseconds to several hundreds of milliseconds. Avoiding this waiting period for the UWB message by transmitting the second information portion B in a UWB channel in the same message M as the first information portion A transmitted in the NB channel, allows thus to significantly reduce the power consumption of the receiver RX.

When the second information portion B of the message M comprises different second information sub-portions B1, B2, B3 transceived at different UWB sub-channels UWB1, UWB2, UWB3, the receiver RX will switch within the UWB mode among different UWB sub-channels. The receiver RX will switch into the UWB sub-channel UWB1, UWB2, UWB3 of the respective second information sub-portion B1, B2, B3, when the first symbol of the respective second information sub-portion B1, B2, B3 is expected according to the well-defined time relationship with one of the previous information (sub-) portions (the first information portion A or one of the previously received second information sub-portions). The receiver RX will switch into the first UWB sub-channel UWB1, when the first symbol of the first second information sub-portion B1 is expected according to the well-defined time relationship with the first information portion A. The receiver RX will switch (from the first UWB sub-channel UWB1) into the second UWB sub-channel UWB2, when the first symbol of the second second information sub-portion B2 is expected according to the well-defined time relationship with the first information portion A or the first second information sub-portion B1. The receiver RX will switch (from the second UWB sub-channel UWB2) into the third UWB sub-channel UWB3, when the first symbol of the third second information sub-portion B3 is expected according to the well-defined time relationship with the first information portion A or the first second information sub-portion B1 or the second second information sub-portion B2.

FIG. 7 shows an exemplary embodiment of a transceiver according to the invention. The transceiver shown in FIG. 7 is a combined transmitter and receiver. In the shown embodiment, the transceiver can be operated in a NB mode for receiving and/or transmitting in a NB communication channel and in a UWB mode for receiving and/or transmitting in a UWB communication channel. If the transceiver is configured to transmit in different UWB sub-channels UWB1, UWB2, UWB3, the UWB mode has different UWB sub-modes (in the description sometimes shortly also referred to as UWB sub-channel). If the transceiver is configured to transmit in different NB sub-channels NB1, NB2, NB3, NB4, the NB mode has different NB sub-modes (in the description sometimes shortly also referred to as NB sub-channel). A controller 13 is configured to switch the transceiver between the different modes. The transceiver comprises the following.

The transceiver comprises an oscillator 12. The oscillator 12 configured to generate in the UWB mode a carrier signal for the UWB channel and in the NB mode a carrier signal for the NB channel. The use of the same oscillator 12 for creating the carrier signal of the UWB channel and of the NB channel allows to detect the clock-offset between the UWB transmitter and the UWB receiver. In the state of the art, normally different transmission circuits with different transmission oscillators have been used for NB and UWB so that it was not possible to determine the clock-offset for the UWB channel from the OOB message in the NB channel. The carrier signal of the UWB channel has preferably a carrier frequency $f_{UWB}$ at a frequency for UWB transmission, e.g. between 6-8.5 GHZ. The carrier signal of the NB channel has preferably a carrier frequency $f_{NB}$ at a frequency for BB transmission. Preferably, the carrier frequency $f_{NB}$ is selected close to the carrier frequency $f_{UWB}$ of the UWB channel, preferably closer than 3 GHZ, preferably closer than 2 GHZ, preferably closer than 1.5 GHZ, preferably closer than 1 GHz, preferably closer than 750 MHz, preferably closer than 500 MHZ. The carrier frequency $f_{NB}$ can be for example between 5 and 6 GHz or between 8 or 8.5 and 9 GHz, while the carrier frequency $f_{UWB}$ is between 6 and 8 or 8.5 GHZ. This would allow to use common receiving hardware for the NB and the UWB channel. The oscillator can be configured to generate different carrier signals of different UWB sub-channels in different UWB sub-modes. Preferably, the oscillator 12 is an adaptive oscillator which can produce the carrier signal of the UWB channel and the carrier signal of the NB channel based on a control input received from a controller 13. The adaptive oscillator 12 is preferably also configured to generate the carrier signal of the different NB sub-channels and/or of the different UWB sub-channels. However, it is also possible that oscillator comprises different sub-oscillators for generating the carrier signal of the NB channel and the UWB channel (or for generating the carrier signal of the different NB sub-channels and/or different UWB sub-channels). The carrier signal generated by the oscillator 12 is preferably used for transmission and for receiving.

The transceiver comprises a signal generator 31 configured to modulate the carrier signal from the oscillator to generate a modulated radio signal. The signal generator 31 is configured in the NB mode to modulate the first information portion A with a narrowband bandwidth on the carrier signal received from the oscillator. The signal generator 31 is configured in the UWB mode to modulate the second information portion B with an UWB bandwidth on the carrier signal received from the oscillator to obtain the modulated (UWB) radio signal. The signal generator 31 is preferably switched between the UWB mode and the NB mode by the controller 13 to obtain the modulated (NB) radio signal. The signal generator 31 is here realised with two parallel signal paths, one for the NB mode and one for the UWB mode and with a switch allowing to switch between the two path according to the selected mode of the transceiver.

The transceiver comprises preferably a transmission amplifier (e.g. a power amplifier) configured to amplify the modulated radio signal.

The transceiver comprises an antenna 11 configured to transmit the (amplified) modulated radio signal and configured to receive a radio signal. Preferably, the same antenna 11 is used for transmitting and receiving. The antenna 11 is configured to transceive a radio signal in the UWB channel and in the NB channel. Preferably, the same antenna 11 is used for the UWB and NB channel. If the UWB channel comprises different UWB sub-channels, the antenna is preferably configured to transceive at the NB channel and all different UWB sub-channels.

The transceiver comprises preferably a receiving amplifier 21 configured to amplify the radio signal received at the antenna 11. The receiving amplifier 21 is preferably a low noise amplifier.

The transceiver comprises a mixer 22 configured to downmix the (amplified) received radio signal to obtain a downmixed signal (often also called intermediate frequency signal or baseband signal). Preferably, the the carrier signal obtained from the oscillator is used to downmix the received radio signal. Thus, the correct carrier frequency is used during receiving for NB and UWB mode as the oscillator's outputs in the respective mode the correct carrier signal.

The transceiver comprises preferably a filter 23 configured to generate a filtered signal. The filter 23 filters the downmixed signal by a NB bandwidth filter in the narrowband mode and a UWB bandwidth filter in the UWB mode. The filter 23 is preferably an adaptive filter controlled by the controller 13 depending on the current mode of the transceiver. However, it is also possible to have distinct filters for the UWB mode and for the NB mode among which are switched depending on the mode of the transceiver.

The transceiver comprises an analogue to digital converter (ADC) 24 configured to convert the (filtered) downmixed signal into a digital signal. The ADC 24 uses in the narrowband mode a first sampling frequency and in the UWB mode a second sampling frequency, wherein the first sampling frequency is lower than the second sampling frequency. The first sampling frequency is preferably below 100 MHz, preferably below 50 MHz, preferably below 20 MHz, preferably below 10 MHZ. The second sampling frequency is preferably above 100 MHz, preferably above 500 MHz, preferably above 700 MHZ, preferably above 800 MHZ, preferably above 900 MHz.

The digital signal is then further processed in a digital signal processor 14. This digital signal processor 14 is preferably a digital baseband unit or digital modem. The digital signal processor 14 is configured to process the digitalized signal from the first information portion A received in the NB channel and to process the digitalized signal of the second information portion B received in the UWB portion. The digital signal processor 14 is configured for example to synchronize the transceiver on the message M (based on the SHR or preamble), to determine the clock-offset (based on the SHR or preamble), to read out data (of the first information portion A, the PHR, the MHR, the MAC payload), to measure the time of arrival (based on the UWB distance pulse sequence).

The controller 13 controls the mode of the transceiver and of the respective parts of the transceiver, in particular of the oscillator 12, the signal generator 31, the filter 23 and the ADC 24. However, the controller 13 can be integrated also in the digital processor 14.

Thus, the transceiver can use the same circuit for the NB mode and the UWB mode. In the state of the art, two different circuits where used for sending NB messages and UWB messages. Preferably, the circuit of FIG. 7 is realised in one combined UWB-NB transceiving chip. This can be achieved by choosing the NB and the UWB carrier frequencies close. Realising the NB and UWB transceiver on the same chip or in the same circuit facilitates also the coordination of the UWB channel and the NB channel in the same frame of the message M. This is very difficult when using different UWB and NB transceiving circuits which need to be coordinated by a CPU or other third controller. An example spectrum of the possible channels of such a chip or circuit is shown in FIG. 8.

FIGS. 5 and 6 show the use of the above-described message M for UWB distance measurement. FIG. 5 shows an embodiment of a method and system of secure distance secure measurement while FIG. 6 shows an embodiment of "simple" distance measurement, i.e. distance measurement without authentication of the prover P.

The system and/or method comprises a verifier V and a prover P.

The verifier V send a first message C or M1 with a first pulse sequence N or Nv to the prover P. The first pulse sequence is a distance pulse sequence as defined above. According to the invention, the first message C or M1 comprises a first information portion A transmitted in the NB channel and a second information portion B transmitted in the UWB portion. The second information portion B comprises the first pulse sequence N or Nv so that the prover P can determine the time of arrival of the first message C or M based on the first pulse sequence received in the UWB channel. Thus, the first pulse sequence is received as a sequence of short UWB pulses whose time of arrival can be detected with a high precision. The first information portion A of the first message C or M1 comprises preferably an identifier (SSID), the SHR and/or the PHR. Thus, (most of) the information not used for the distance measurement is thus transmitted in the NB channel with a much lower power consumption. Especially, the long and power consuming waiting periods for UWB messages at the prover P can be fully avoided, as the waiting period for the first message M1 or C is realized fully in the NB channel at a much lower power consumption. Thus, the first pulse sequence can be transmitted with a higher power, as the UWB portion of the message does not need to be wasted for data information transfer in the UWB channel. For secure distance measurement as shown in FIG. 5, the first information portion A, preferably the first information portion payload P1, preferably the MAC payload comprises further encrypted information like the encrypted SSID (in addition to the SSID in clear format) and/or the encrypted first pulse sequence or its corresponding distance pulse information. The encryption is based on a common key known by both verifier V and prover P, preferably a symmetric key. The first pulse sequence for secure distance measurement is also called the challenge pulse sequence and/or the first message C is also called the challenge message.

The prover P detects in the NB channel the first message C or M1. The prover P reads out the (non time relevant) information from the first information portion A, like the SSID (and for secure distance measurement in encrypted form the SSID and the distance pulse information ENC-MACK(SSID, Nv)). For secure distance measurement, the prover P decrypts the encrypted information. The knowledge of the distance pulse information Nv allows to know the expected challenge pulse sequence Nv which will arrive in the UWB channel of the second information portion B. This knowledge facilitates the detection of the time of arrival based on the distance pulse sequence Nv. For the "simple" distance measurement in FIG. 6, preferably a fixed and/or periodic first pulse sequence N is used which facilitates the detection of the first pulse sequence in the UWB channel and/or the measurement of the time of arrival of the first message M1 at the prover P based on the first pulse sequence N. Based on the information from the first information portion A received in the NB channel and based on the well-defined time relationship between the first information portion A and the second information portion B, the prover P can determine the expected time, when the first symbol of the second information portion B will be received. The prover P switches at this time in the UWB mode to receive the second information portion B, in particular to receive the first pulse sequence N or Nv. The prover P determines based on the first pulse sequence Nv the time of arrival of the first message C or M1. The prover P determines the prover time difference DTp based on the time of arrival of the first message C or M1 and the time of transmitting the second message R or M2. For secure distance measurement, the prover P verifies then the authenticity of the verifier V by decrypting the SSID and the Nv and comparing it with the SSID transferred without encryption in the first information portion of the challenge message C and with the challenge pulse sequence Nv received in the second information portion of the message M.

The prover P sends back a second message M2 or R. The second message M2 or R comprises a first information portion in the NB channel and a subsequent second information portion in the UWB channel. The second information portion B comprises the second pulse sequence N or Np. The second pulse sequence is a distance pulse sequence as defined above. For secure distance measurement, the second message is often called response message R and the second pulse sequence is often called response pulse sequence. The prover P transmits in the first information portion A the SSID and the prover time difference DTp. For secure distance measurement, the prover P transmits preferably in the first information portion A in addition in encrypted form the SSID (in addition to its clear form), the response pulse information Np and the prover time difference (only in encrypted form) ENC-MACK(SSID, Np, DTp). For the simple distance measurement in FIG. 6, the second pulse sequence can be the same as the first pulse sequence. However, it can also be used a different pulse sequence in the first and second message M1 and M2. The second pulse sequence for the simple distance measurement is preferably a periodic and/or fixed pulse sequence.

The verifier V receives the first information portion A of the first message R or M2 in the NB channel. For secure distance measurement, the verifier V decrypts the encrypted information of the first information portion A of the response message R. The encrypted information is decrypted with the common key. The decryption can happen before or after or during the receiving of the second information portion B. Based on the information from the first information portion A received in the NB channel and based on the well-defined time relationship between the first information portion A and the second information portion B, the prover P can determine the expected time, when the first symbol of the second information portion B will be received. The verifier V switches at this time in the UWB receiving mode or switches the UWB receiving mode on to receive the second information portion B of the second message R or M2, in particular to receive the second pulse sequence N or Np. The verifier V determines based on the response pulse sequence Np the time of arrival of the message R. The verifier V determines the verifier time difference DTv between sending out the first message C or M1, in particular the first pulse sequence N or Nv and receiving the second message M2 or R, in particular the second pulse sequence N or Np at the verifier V. The verifier V calculates then the time of flight ToF as the difference of the verifier time difference DTv and the prover time difference DTp. For secure distance measurement, the verifier V verifies then the authenticity of the prover P by decrypting the SSID and the response pulse information Np and comparing it with the SSID transferred without encryption in the first information portion A of the message R and with the Np received in the second information portion B of the message R. If the time of flight ToF or the corresponding distance is smaller than a threshold and if the authenticity of the prover P has been approved, a certain request can be approved.

For very power sensitive applications, a further wake up message W in a low power channel can be sent from the verifier V to the P to switch the NB receiving mode on only, when such a wake-up message W is received. The listening in the low power channel is then even less power consuming than in the NB channel. The low power channel can be a NB channel at a lower carrier frequency, e.g. a low frequency (LF) frequency. Such a wake-up message W is shown in the embodiment of FIG. 5, but could equally be applied in an embodiment as described in FIG. 6. While it seems very advantageous to send the prover time difference in the second message M1 or response message R from the prover P to the verifier V, it would also be possible to solve this differently. For example, the prover P could send the response message always after a fixed time after having received the message C or M1 from the verifier V. When the verifier V knows this fixed time, it is not necessary to transmit the prover time difference DTp.

It should be understood that the present invention is not limited to the described embodiments and that variations can be applied without going outside of the scope of the claims.

The invention claimed is:

1. Method for transceiving a message for UWB distance measurement, comprising the steps of:

transceiving a first information portion of the message via a narrowband channel, transceiving after the first information portion a second information portion of the message via a UWB channel, wherein the second information portion comprises a distance pulse sequence being a pulse sequence to be used for distance measurement, wherein the first information portion and the second information portion are transceived in a common message frame of the message;

wherein transceiving the first information portion via the narrowband channel and transceiving after the first information portion the second information portion via the UWB channel comprises either:

transmitting, by a transmitter, the first information portion via the narrowband channel and the transmitter is transmitting after the first information portion the second information portion via the UWB channel, wherein the transmitter comprises a transmission circuit configured to be operated in a narrowband mode and in a UWB mode, wherein the transmission circuit comprises:

an oscillator for generating in the narrowband mode a first carrier signal for the narrowband channel as a carrier signal of the oscillator for the first information portion and in the UWB mode a second carrier signal for the UWB channel as the carrier signal of the oscillator for the second information portion, a signal generator for modulating the carrier signal from the oscillator to generate a modulated radio signal, wherein the signal generator is configured in the narrowband mode to modulate the first information portion on the carrier signal received from the oscillator and in the UWB mode to modulate the second information portion on the carrier signal received from the oscillator, a transmission amplifier for amplifying the modulated radio signal, and an antenna for transmitting the amplified modulated radio signal; or receiving, by a receiver, the first information portion via the narrowband channel and receiving after the first information portion the second information portion via the UWB channel, wherein the receiver comprises a receiving circuit configured to be operated in a narrowband mode and in a UWB mode, wherein the receiving circuit comprises:

an antenna for receiving a radio signal, a receiving amplifier for amplifying the radio signal received at the antenna, an oscillator for generating in the narrowband mode a first carrier signal for the narrowband channel as a carrier signal of the oscillator and in the UWB mode a second carrier signal for the UWB channel as the carrier signal of the oscillator, a mixer for downmixing the amplified radio signal with the respective carrier signal obtained from the oscillator a filter for generating a filtered signal, in the narrowband mode, by filtering out from the downmixed radio signal the frequencies outside of the narrowband channel and, in the UWB mode, by filtering out from the downmixed radio signal the frequencies outside of the UWB channel, an analogue to digital converter converts the filtered radio signal into a digital signal, wherein the analogue to digital converter uses in the narrowband mode a first sampling frequency and in the UWB mode a second sampling frequency, wherein the first sampling frequency is lower than the second sampling frequency, and a digital processor configured to process the digital signal to process the first information portion in the narrowband mode and to process the second information portion in the UWB mode.

2. Method according to claim 1, wherein the second information portion is transceived in a time period after the first information portion defined by the common message frame.

3. Method according to claim 2, wherein, when the message is a received at a receiver, the receiver switches on a circuitry for receiving the UWB based on the time period defined by the common message frame after the first information portion has been received.

4. Method according to claim 1, wherein, when the message is a received at a receiver of the message, the receiver determines a clock offset based on the first information portion, wherein the clock-offset defines the offset of the system clock of the receiver from a system clock of a transmitter of the message, wherein the clock-offset between the system clock of the receiver and the system clock of the transmitter leads to different length and/or different carrier phase of a symbol of the message transmitted at the transmitter and expected at the receiver, wherein the receiver detects the second information portion of the message using the system clock of the receiver and the clock-offset determined based on the first information portion.

5. Method according to claim 1, wherein the second information portion is transceived in the UWB channel without a message portion comprising a preamble, a start of frame delimiter and packet header.

6. Method according to claim 1, wherein the first information portion comprises an information about the length of the second information portion allowing to determine the end of the transceived message in the UWB channel.

7. Method according to claim 1, wherein the first information portion is transceived by the same chip, by the same antenna and/or by the same transceiving circuit as the second information portion.

8. Method according to claim 1, wherein the UWB channel has at least two different UWB sub-channels, wherein the distance pulse sequence is divided in at least two distance pulse sub-sequences, wherein the at least two distance pulse sub-sequences are transceived in at least two second information sub-portions of the second information portion transceived at the at least two different UWB sub-channels, wherein the first information portion and the at least two second information sub-portions are transceived in a common message frame of the message.

9. Method for distance measurement between a verifier and prover comprising the following steps:

sending a first message with a first pulse sequence from the verifier to the prover;

sending a second message with a second pulse sequence from the prover to the verifier;

measuring the distance between the verifier and the prover based on a verifier time difference between sending the first message from the verifier and receiving the second message at the verifier;

wherein the first message comprises a first information portion including synchronization information and a second information portion comprising the first pulse sequence, wherein the second information portion is transmitted after the first information portion, wherein the first information portion is transmitted via a narrowband channel and the second information portion is transmitted via a UWB channel, wherein the second information portion comprises a security pulse sequence for providing secure distance measurement, wherein the security pulse sequence is distinct from the distance pulse sequence, wherein the prover determines the time of arrival of the first message based on the distance pulse sequence, wherein the prover verifies the security of the time of arrival of the first message based on the following steps:

determining an expected time of arrival of the security pulse sequence based on the time of arrival of the first message;

decoding an UWB signal received in the UWB channel at the prover at the time of arrival of the security pulse sequence to obtain a decoded security bit sequence;

comparing the decoded security bit sequence with an expected security bit sequence to verify the security of the time of arrival of the first message.

10. Method according to claim 9, wherein the first information portion of the second message comprises a prover time information, wherein the prover time information indicates the time between the receiving of the first message at the prover and the sending of the second message from the prover, wherein the distance between the verifier and the prover is determined based on the verifier time difference and the prover time difference.

11. Method according to claim 9, wherein the steps of sending the first message from the verifier to the prover, of sending the second message from the prover to the verifier and measuring the distance between the verifier and the prover are repeated in two or more iterations, wherein in at least two of the iterations, a different UWB sub-channel of the UWB channel is used to transmit the second information portion of the first or second message wherein the final distance between the verifier and the prover is determined based on the distances between the verifier and the prover measured in the two or more iterations.

12. Method according to claim 9, wherein the second information portion of the first message comprises a plurality of second information sub-portions, wherein the second information sub-portions are transmitted in different UWB frequency-time portions, wherein each different UWB frequency-time portion is defined as a portion of the UWB frequency-time domain having an independent link budget, wherein the distance pulse sequence and the security pulse sequence are sent in different second information sub-portions transmitted in different UWB frequency-time portions.

13. Device for transceiving a message for UWB distance measurement, comprising:

a transceiver configured to transceive a first information portion via a narrowband channel and to transceive after the first information portion a second information portion via a UWB channel, wherein the second information portion comprises a distance pulse sequence for distance measurement, wherein the transceiver comprises a transceiving circuit configured to be operated in a narrowband mode and in a UWB mode, comprising:

an oscillator configured to generate in the narrowband mode a first carrier signal for the narrowband channel as a carrier signal of the oscillator for the first information portion and in the UWB mode a second carrier signal for the UWB channel as the carrier signal of the oscillator for the second information portion, and a signal generator configured to modulate the carrier signal from the oscillator to generate a modulated radio signal, wherein the signal generator is configured in the narrowband mode to modulate the first information portion on the carrier signal received from the oscillator and in the UWB mode to modulate the second information portion on the carrier signal received from the oscillator, and a transmission amplifier configured to amplify the modulated radio signal.

14. Method according to claim 9, wherein the security of the time of arrival of the first message is verified, if a number of errors in the decoded security bit sequence is below a threshold.

15. Device according to claim 13, wherein the transceiving circuit comprises:

an antenna configured to transmit the amplified modulated radio signal and configured to receive a radio signal, a receiving amplifier configured to amplify the radio signal received at the antenna, a mixer configured to downmix the amplified radio signal with the carrier signal obtained from the oscillator, a filter configured to generate a filtered signal by in the narrowband mode filtering out from the downmixed amplified radio signal the frequencies outside of the narrowband channel and in the UWB mode filtering out from the downmixed amplified radio signal the frequencies outside of the UWB channel, a analogue to digital converter configured to convert filtered signal into a digital signal, wherein analogue to digital converter uses in the narrowband mode a first sampling frequency and in the UWB mode a second sampling frequency, wherein the first sampling frequency is lower than the second sampling frequency, and a digital processor configured to process the digital signal.

16. Device according to claim 13, wherein the narrowband channel has a carrier frequency between 5 GHz and 6 GHz or between 8.5 GHz and 9 GHz and the UWB channel has a carrier frequency between 6 GHz and 8.5 GHz.

17. System for distance measurement between a verifier and prover comprising the verifier and the prover, wherein the verifier is configured to send a first message with a first pulse sequence to the prover, wherein the prover is configured, after having received the first message, to send a second message with a second pulse sequence to the verifier, wherein the verifier is configured to measure the distance between the verifier and the prover based on the verifier time difference, wherein the verifier time difference is the time difference between sending the first message from the verifier and receiving the second message at the verifier;

wherein each of the verifier and prover comprises a respective transceiver, wherein each transceiver is configured to:

transceive a first information portion via a narrowband channel, and transceive after the first information portion a second information portion via a UWB channel, wherein the second information portion comprises the first or second pulse sequence for distance measurement, wherein each transceiver comprises a transceiving circuit configured to be operated in a narrowband mode and in a UWB mode. comprising:

an analogue to digital converter configured to convert a received radio signal into a digital signal, wherein the analogue to digital converter uses in the narrowband mode a first sampling frequency and in the UWB mode a second sampling frequency, wherein the first sampling frequency is lower than the second sampling frequency, and a digital processor configured to process the digital signal to process the first information portion in the narrowband mode and to process the second information portion in the UWB mode.

18. System according to claim 17, wherein the transceiving circuit further comprises:

a mixer configured to downmix the amplified radio signal with the carrier signal obtained from the oscillator, wherein the oscillator is configured to generate, in the narrowband mode, a first carrier signal for the narrowband channel to downmix the amplified radio signal, and to generate, in the UWB mode, a second carrier signal to downmix the amplified radio signal, a filter configured to generate a filtered signal by, in the narrowband mode, filtering out from the downmixed amplified radio signal the frequencies outside of the narrowband channel and by, in the UWB mode, filtering out from the downmixed amplified radio signal the frequencies outside of the UWB channel, wherein the analogue to digital converter is configured to convert the filtered signal into a digital signal.

* * * * *